(12) United States Patent
Lee

(10) Patent No.: US 9,748,855 B2
(45) Date of Patent: Aug. 29, 2017

(54) BIDIRECTIONAL DC-DC CONVERTER

(71) Applicant: LG INNOTEK CO., LTD., Seoul (KR)

(72) Inventor: Jae Sam Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/159,053

(22) Filed: May 19, 2016

(65) Prior Publication Data
US 2016/0344297 A1 Nov. 24, 2016

(30) Foreign Application Priority Data
May 19, 2015 (KR) ........................ 10-2015-0069496

(51) Int. Cl.
*H02M 3/335* (2006.01)
*H02M 1/00* (2006.01)

(52) U.S. Cl.
CPC ... *H02M 3/33592* (2013.01); *H02M 3/33584* (2013.01); *H02M 2001/0009* (2013.01); *H02M 2001/0058* (2013.01); *Y02B 70/1475* (2013.01); *Y02B 70/1491* (2013.01)

(58) Field of Classification Search
CPC . H02M 2001/0009; H02M 2001/0003; H02M 2001/0058; H02M 1/08; H02M 1/082; H02M 3/156; H02M 3/157; H02M 3/158; H02M 3/1588; H02M 3/335; H02M 3/33507; H02M 3/33584; H02M 3/33515; H02M 3/33592; H02M 7/783; H02M 7/7807; H02M 2007/4815
See application file for complete search history.

(56) References Cited

U.S. PATENT DOCUMENTS

| 4,953,068 A * | 8/1990 | Henze | H02M 3/33584 363/127 |
| 8,466,662 B2 * | 6/2013 | Nania | H02J 3/383 323/207 |
| 2013/0343093 A1 * | 12/2013 | Ando | H02M 3/33584 363/17 |
| 2014/0104890 A1 * | 4/2014 | Matsubara | H02M 3/33584 363/17 |
| 2014/0362621 A1 * | 12/2014 | Huang | H02M 1/32 363/50 |
| 2015/0229225 A1 * | 8/2015 | Jang | H02M 3/285 363/17 |
| 2016/0105119 A1 * | 4/2016 | Akamatsu | H02M 7/4807 363/21.04 |
| 2016/0139651 A1 * | 5/2016 | Schramm | G06F 1/3287 713/323 |
| 2016/0181925 A1 * | 6/2016 | Chiang | H02M 3/33584 363/17 |

* cited by examiner

*Primary Examiner* — Emily P Pham
*Assistant Examiner* — Shahzeb K Ahmad
(74) *Attorney, Agent, or Firm* — Saliwanchik, Lloyd & Eisenschenk

(57) ABSTRACT

A bidirectional DC-DC converter is disclosed. According to the bidirectional DC-DC converter, switching loss is reduced by implementing zero voltage switching of switching devices in a boost mode of the bidirectional DC-DC converter. Accordingly, it is possible to realize the high efficiency of power conversion. Further, switching devices of the bidirectional DC-DC converter are controlled using simple logic devices, thereby controlling a plurality of directional DC-DC converters coupled in parallel to each other.

20 Claims, 26 Drawing Sheets

BIDIRECTIONAL DC-DC CONVERTER

CROSS-REFERENCE TO RELATED APPLICATIONS

This application claims priority under 35 U.S.C. §119 to Korean Patent Application No. 10-2015-0069496, filed May 19, 2015, which is herein incorporated by reference in its entirety.

BACKGROUND

The present disclosure relates to a bidirectional DC-DC converter.

A voltage input to an electronic circuit should be boosted to a high voltage so as to supply energy to the electronic circuit requiring a relatively high voltage or to use the electronic circuit in an application field in connection with a system. In addition, it is required to drop a voltage input to an electronic circuit to a low voltage using a high voltage. To this end, modeling and analysis for a DC-DC converter as one of various step-up and step-down converters has been studied.

The DC-DC converter may be broadly classified into an isolation type converter and a non-isolation type converter.

In the isolation type converter, input and output stages are isolated using a transformer using a magnetic core, thereby ensuring stability. Further, a voltage step-up/step-down ratio can be adjusted through the adjustment of a turn ratio.

As kinds of the DC-DC converter, buck type converters are a forward converter, a half bridge converter, a full bridge converter, and the like, and buck-boost type converters are a flyback converter, and the like.

The DC-DC converter is formed as one chip with a controller that controls the DC-DC converter by detecting an error between output signals, and therefore, may be referred to as a switched mode supply unit.

The technological development of a bidirectional power converter has recently increased. Here, the bidirectional power converter is formed by combining, as one, a converter for charging a load by stepping down an input voltage and outputting the stepped-down voltage and a converter for discharging a load by stepping up an output voltage and regenerating the stepped-up voltage as an input voltage.

BRIEF SUMMARY

Embodiments provide a bidirectional DC-DC converter which implements zero voltage switching of switching devices in bidirectional power conversion and controls an output voltage in boosting of a voltage by using simple logic devices, thereby realizing the high efficiency of the power conversion.

In one embodiment, a bidirectional DC-DC converter includes: a transformer; a primary-side full bridge circuit coupled to a primary side of the transformer, the primary-side full bridge circuit having first and second switching devices of a first leg and third and fourth switching devices of a second leg; a secondary-side full bridge circuit coupled to a secondary side of the transformer, the secondary-side full bridge circuit having fifth and sixth switching devices of a third leg and seventh and eighth switching devices of a fourth leg; a first capacitor coupled to the primary-side full bridge circuit; a second capacitor coupled to the secondary-side full bridge circuit; and a controller for controlling the primary-side and secondary-side full bridge circuits, wherein the controller includes: a control signal generator for outputting a first control signal on the basis of a sensing signal; a memory device for outputting a second control signal having a logic level opposite to a previous logic level and a third control signal having the opposite logic level to the second control signal in synchronization with a shift of the first control signal; a first calculator for outputting a pulse signal having a first logic level when at least one of the first and second control signals has the first logic level and outputting a second pulse having the first logic level when at least one of the first and third control signals has the first logic level; and a second calculator for outputting first to eighth gating signals for respectively controlling the first to eight switching devices on the basis of the first and second pulse signals.

The bidirectional DC-DC converter may further include: a first inductor coupled between the primary-side full bridge circuit and the primary side of the transformer; and a second inductor coupled between the secondary-side full bridge circuit and the second capacitor.

The sensing signal may be a sensing current flowing in the second inductor.

The control signal generator may output the first control signal on the basis of a sensing voltage sensed at both terminals of the first capacitor and the sensing current.

The controller may control the first to eighth switching devices to boost a voltage applied to the second capacitor and transfer the boosted voltage to the first capacitor.

The memory device may output the second control signal having a logic level opposite to a previous logic level in synchronization with a rising edge of the first control signal.

The memory device may include a T flip-flop for outputting the second control signal as a Q signal and outputting the third signal as a Q bar signal, on the basis of the first control signal.

The first calculator may include: a first OR gate for outputting a first pulse signal on the basis of the first and second control signals; and a second OR gate for outputting a second pulse signal on the basis of the first and third control signals. The first logic level may be a high logic level.

The second calculator may output the first pulse signal as the fifth and eighth gating signals, invert the first pulse signal and output the inverted signal as the first and fourth gating signals, output the second pulse signal as the sixth and seventh gating signals, and invert the second pulse signal and output the inverted signal as the second and third gating signals.

The second calculator may include: a first NOT gate for inverting the first pulse signal and outputting the inverted signal as first and fourth gating signals; and a second NOT gate for inverting the second pulse signal and outputting the inverted signal as second and third gating signals.

In another embodiment, a bidirectional DC-DC converter includes: a transformer; a primary-side full bridge circuit coupled to a primary side of the transformer, the primary-side full bridge circuit having first and second switching devices of a first leg and third and fourth switching devices of a second leg; a secondary-side full bridge circuit coupled to a secondary side of the transformer, the secondary-side full bridge circuit having fifth and sixth switching devices of a third leg and seventh and eighth switching devices of a fourth leg; a first capacitor coupled to the primary-side full bridge circuit; a second capacitor coupled to the secondary-side full bridge circuit; and a controller for controlling the primary-side and secondary-side full bridge circuits, wherein the controller includes: a control signal generator for outputting a first control signal on the basis of a sensing signal; a memory device for outputting second and fourth control signals having a logic level opposite to a previous logic level and a third control signal having the opposite logic level to the second control signal in synchronization with a shift of the first control signal; and a calculator for outputting first to eighth gating signals according to logic levels of the first to fourth control signals.

The bidirectional DC-DC converter may further include: a first inductor coupled between the primary-side full bridge circuit and the primary side of the transformer; and a second inductor coupled between the secondary-side full bridge circuit and the second capacitor.

The sensing signal may be a sensing current flowing in the second inductor.

The control signal generator may output the first control signal on the basis of a sensing voltage sensed at both terminals of the first capacitor and the sensing current.

The memory device may output the second control signal having a logic level opposite to a previous logic level in synchronization with a rising edge of the first control signal, and output the fourth control signal having a logic level opposite to a previous logic level in synchronization with a falling edge of the first control signal.

The memory device may include: a first T flip-flop for outputting the second control signal as a Q signal and outputting the third signal as a Q bar signal, on the basis of the first control signal; and a second T flip-flop for outputting the fourth control signal as a Q signal on the basis of the first control signal of which logic level is inverted.

The calculator may include: a first OR gate for outputting a signal having a high logic level when at least one of the first and second control signals has the high logic level, on the basis of the first and second control signals; and a second OR gate for outputting a signal having the high logic level when at least one of the first and third control signals has the high logic level, on the basis of the first and third control signals.

The output signal of the first OR gate may be the fifth and eighth gating signals, and the output signal of the second OR gate may be the sixth and seventh gating signals.

The calculator may output the second control signal as the third gating signal, and output the fourth control signal as the first gating signal.

The calculator may include: a first dead time setting unit for adjusting the width of the high logic level of the second control signal and outputting the second control signal as the fourth gating signal; and a second dead time setting unit for adjusting the width of the high logic level of the third control signal and outputting the third control signal as the second gating signal.

According to the present disclosure, switching loss is reduced by implementing zero voltage switching of switching devices in a boost mode of the bidirectional DC-DC converter. Accordingly, it is possible to realize the high efficiency of power conversion. Further, switching devices of the bidirectional DC-DC converter are controlled using simple logic devices, thereby controlling a plurality of directional DC-DC converters coupled in parallel to each other.

The details of one or more embodiments are set forth in the accompanying drawings and the description below. Other features will be apparent from the description and drawings, and from the claims.

DETAILED DESCRIPTION

Figure 1:
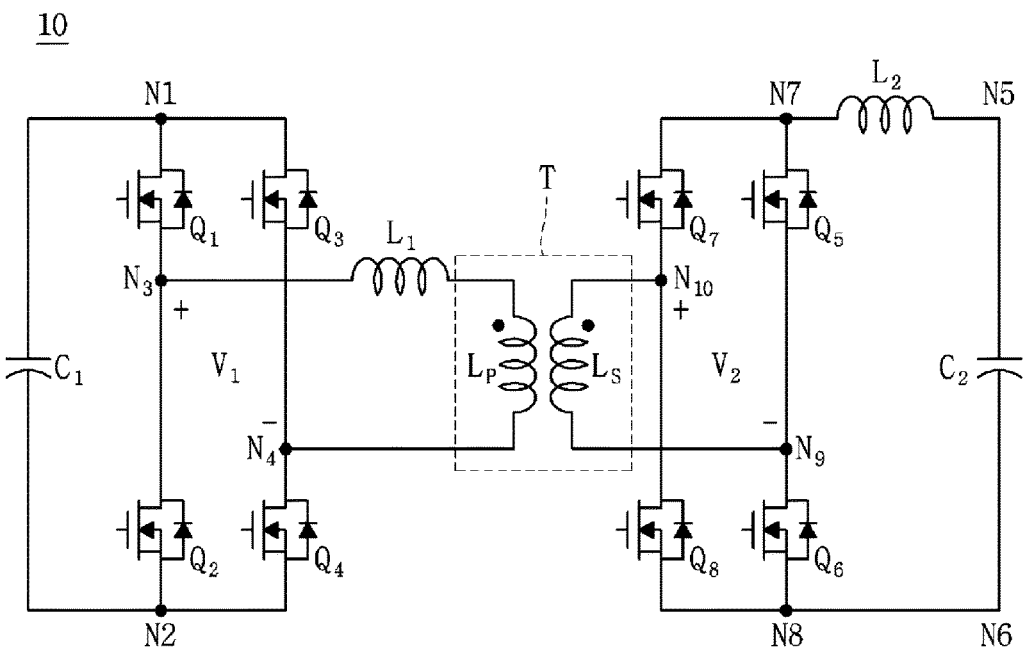
FIG. 1 is a circuit diagram of a bidirectional DC-DC converter according to an embodiment.

Hereinafter, exemplary embodiments will be described in detail with reference to the accompanying drawings. The technical objective of embodiments is not limited to the aforementioned technical problem, and technical problems not mentioned above can be clearly understood by a person skilled in the art by the disclosure below. In the drawings, the sizes, thicknesses and the like of devices are exaggerated for convenience of illustration. Like reference numerals indicate like elements throughout the specification and drawings.

<Circuit Diagram of DC-DC Converter>

FIG. 1 is a circuit diagram of a bidirectional DC-DC converter according to an embodiment.

A coupling relationship between circuit devices constituting the bidirectional DC-DC converter according to the embodiment will be described with reference to FIG. 1.

The bidirectional DC-DC converter 10 according to the embodiment, based on a transformer T including first and second coils $L_P$ and $L_S$, may be divided into a primary circuit at a left side thereof and a secondary circuit at a right side thereof. The primary circuit may include a first capacitor $C_1$, a first inductor $L_1$, and switching devices $Q_1$ to $Q_4$ constituting a primary-side full bridge circuit. The secondary circuit may include a second capacitor $C_2$, a second inductor $L_2$, and switching devices $Q_5$ to $Q_8$ constituting a secondary-side full bridge circuit.

In the primary circuit, the first capacitor $C_1$ is coupled between first and second nodes N1 and N2, the first inductor $L_1$ is coupled between a third node N3 and one terminal of the first coil $L_P$, and the first coil $L_P$ is coupled between the first inductor $L_1$ and a fourth node N4. The primary-side full bridge circuit includes first and second legs between the first and second nodes N1 and N2. The first leg includes a first switching device $Q_1$ coupled between the first and third nodes N1 and N3 and a second switching device $Q_2$ coupled between the third and second nodes N3 and N2. The second leg includes a third switching device $Q_3$ coupled between the first and fourth nodes N1 and N4 and a fourth switching device $Q_4$ coupled between the fourth and second nodes N4 and N2.

In the secondary circuit circuit, the second capacitor $C_2$ is coupled between fifth and sixth nodes N5 and N6, the second inductor $L_2$ is coupled between the fifth node N5 and a seventh node N7, and the second coil $L_S$ is coupled between tenth and ninth nodes N10 and N9. The primary-side full bridge circuit includes third and fourth legs between the seventh node N7 and an eighth node N8. The third leg includes a fifth switching device $Q_5$ coupled between the seventh and ninth nodes N7 and N9 and a sixth switching device $Q_6$ coupled between the ninth and eighth nodes N9 and N8. The fourth leg includes a seventh switching device $Q_7$ coupled between the seventh and tenth nodes N7 and N10 and an eighth switching device $Q_8$ coupled between the tenth and eighth nodes N10 and N8.

The DC-DC converter 10 according to the embodiment is a bidirectional converter. In a step down mode, a DC output voltage is output to the fifth and sixth nodes N5 and N6 by stepping down a DC input voltage between the first and second nodes N1 and N2. In a step up mode, a DC output voltage is output to the first and second nodes N1 and N2 by stepping up a DC input voltage between the fifth and sixth nodes N5 and N6.

Step Down Mode

Hereinafter, an operation in the step down mode will be described with reference to FIGS. 2 to 6.

Figure 2:
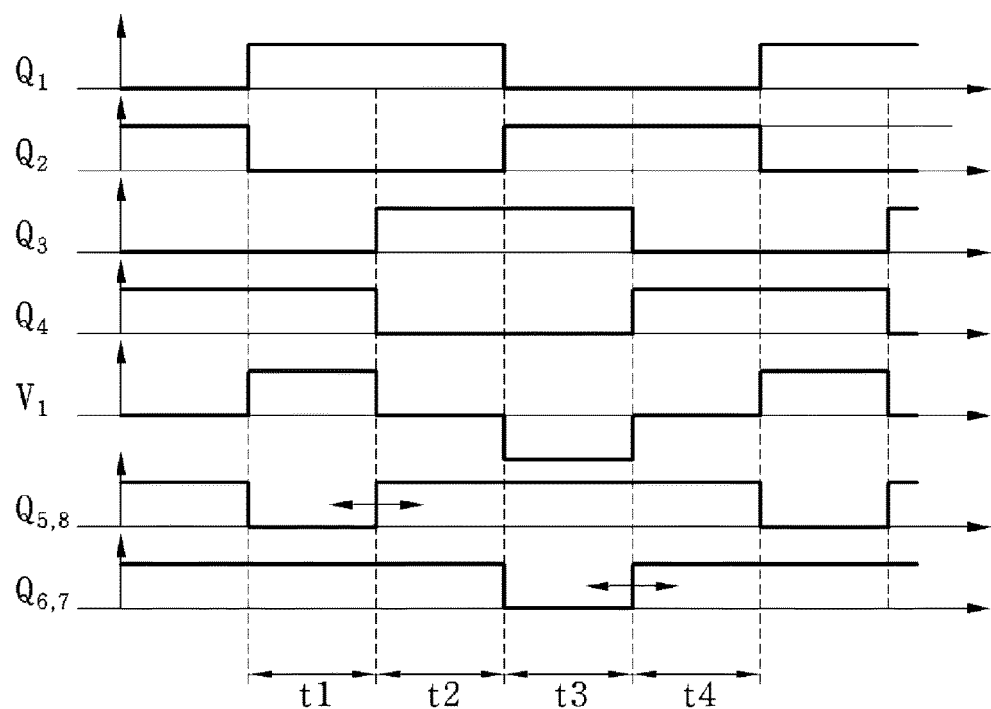
FIG. 2 is a timing diagram in a step down mode.

FIG. 2 is a timing diagram in the step down mode. FIGS. 3 to 6 are diagrams illustrating an operation according to the timing diagram of FIG. 2.

The first and second switching devices $Q_1$ and $Q_2$ of the first leg are complementarily operated with each other. Therefore, if any one of the first and second switching devices $Q_1$ and $Q_2$ is turned on, the other of the first and second switching devices $Q_1$ and $Q_2$ is turned off. Also, the third and fourth switching devices $Q_3$ and $Q_4$ of the second leg are complementarily operated with each other. Therefore, if any one of the third and fourth switching devices $Q_3$ and $Q_4$ is turned on, the other of the third and fourth switching devices $Q_3$ and $Q_4$ is turned off. The first to fourth switching devices $Q_1$, $Q_2$, $Q_3$ and $Q_4$ may be operated by a phase shifted switching method in which the third switching device $Q_3$ is turned on after a certain time elapses after the first switching device $Q_1$ is turned on, and the fourth switching device $Q_4$ is turned on after a certain time elapses after the second switching device $Q_2$ is turned on. In addition, the fifth and eighth switching devices $Q_5$ and $Q_8$ may be simultaneously turned on or turned off, and the sixth and seventh switching devices $Q_6$ and $Q_7$ may be simultaneously turned on or turned off.

<First Time Zone t1>

Figure 3:
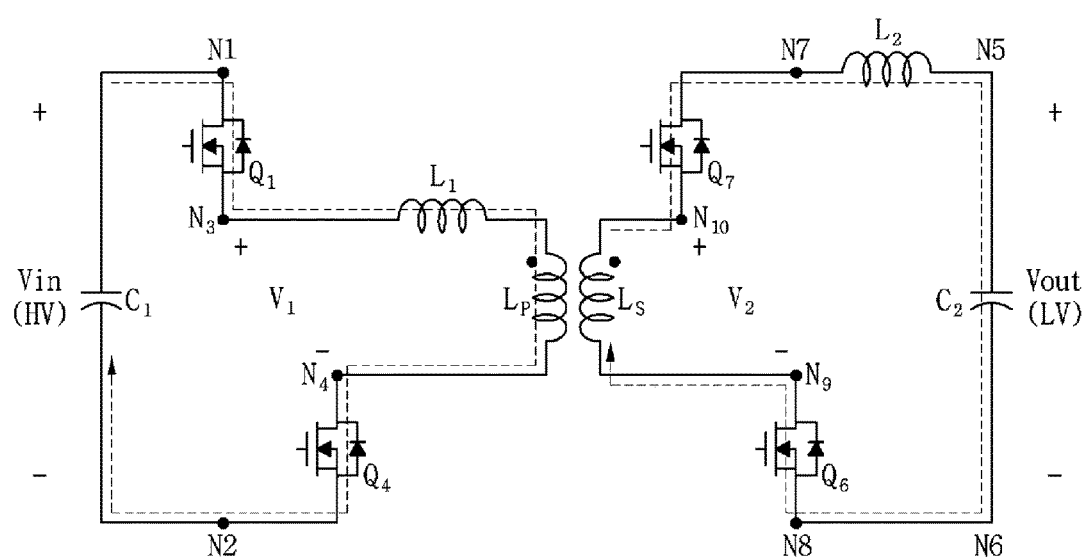
FIGS. 3 to 6 are diagrams illustrating an operation according to the timing diagram of FIG. 2.

Referring to FIGS. 2 and 3, during a first time zone t1, the first and fourth switching devices $Q_1$ and $Q_4$ are turned on, and the second and third switching devices $Q_2$ and $Q_3$ are turned off. In addition, the fifth and eighth switching devices $Q_5$ and $Q_8$ are turned off, and the sixth and seventh switching devices $Q_6$ and $Q_7$ are turned on. At this time, a primary-side current, as indicated by a dotted line at a primary side of the transformer T, flows in an order of the first switching device $Q_1$, the third node N3, the fourth node N4, the fourth switching device $Q_4$, and the second node N2, and a first voltage $V_1$ becomes a positive voltage as the first inductor $L_1$ is charged. The transformer T forms a secondary-side current at a secondary-side thereof on the basis of the primary-side current and a turn ratio thereof. The secondary-side current flows via the seventh switching device $Q_7$, the seventh node N7, the second inductor $L_2$, the second capacitor $C_2$, and the sixth switching device $Q_6$. Also, the secondary-side current charges the second inductor $L_2$, so that the second inductor $L_2$ stores energy.

<Second Time Zone t2>

Figure 4:
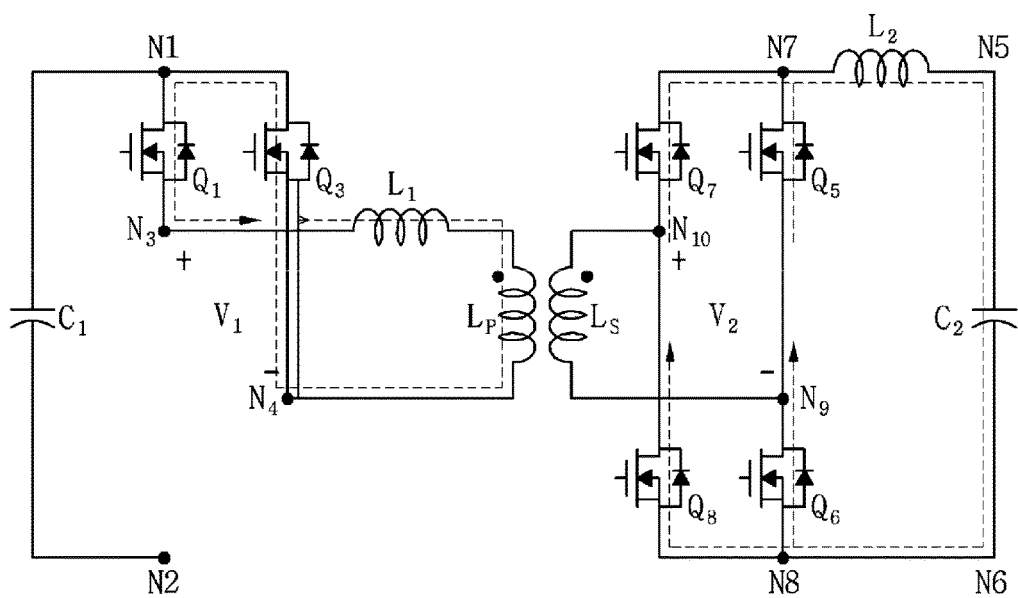

Referring to FIGS. 2 and 4, during a second time zone t2, the first switching device $Q_1$ maintains the turn-on state, but the fourth switching device $Q_4$ is turned off. The third switching device $Q_3$, which was in the turn-off state during the first time zone t1, is turned on. The second switching device $Q_2$ maintains the turn-off state. The secondary-side switching devices $Q_5$ to $Q_8$ are all turned on. In this case, the first and third switching devices $Q_1$ and $Q_3$ form a primary-side current path, and therefore, the first voltage $V_1$ becomes 0 V as the third and fourth nodes N3 and N4 are short-circuited to each other. In addition, since the secondary-side switching devices $Q_5$ to $Q_8$ are all turned on, a second voltage $V_2$ also becomes 0 V, and the energy stored in the second inductor $L_2$ is transferred to the output terminals N5 and N6.

<Third Time Zone t3>

Figure 5:
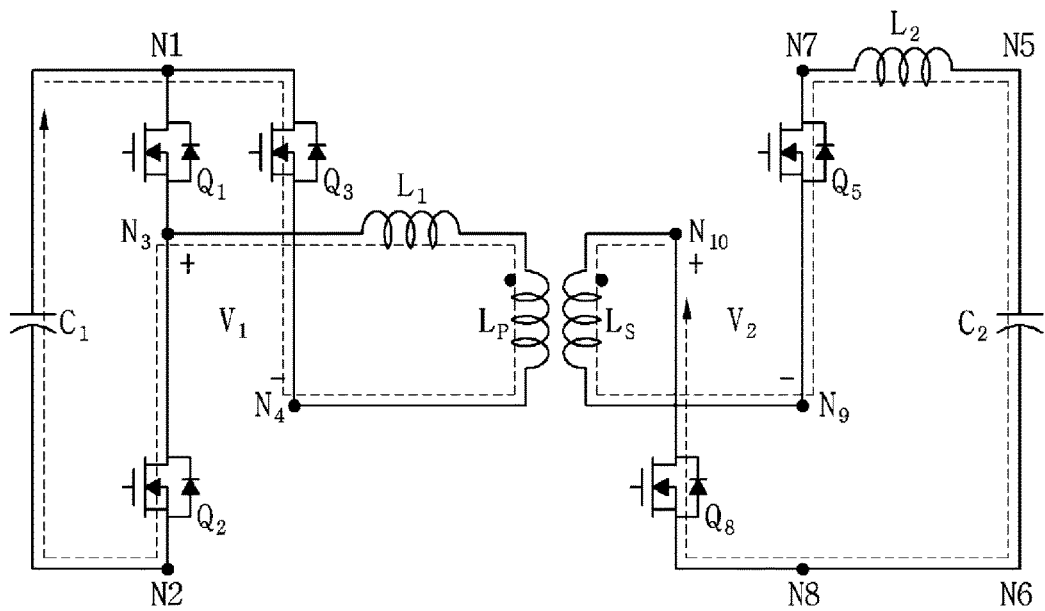

Referring to FIGS. 2 and 5, during a third time zone t3, the first and fourth switching devices $Q_1$ and $Q_4$ are turned off, and the second and third switching devices $Q_2$ and $Q_3$ are turned on. Also, the fifth and eighth switching devices $Q_5$ and $Q_8$ are turned on, and the sixth and seventh switching devices $Q_6$ and $Q_7$ are turned off. At this time, a primary-side current, as indicated by a dotted line in the primary side circuit, flows in an order of the third switching device $Q_3$, the fourth node N4, the third node N3, and the second switching device $Q_2$. That is, the primary-side current flows in the opposite direction to the primary-side current in the first time zone t1. In addition, the first voltage $V_1$ becomes a negative voltage as the first inductor $L_1$ is charged by the primary-side current. The primary-side current is transferred to the secondary side by the transformer T. A secondary-side current flows via the fifth switching device $Q_5$, the second inductor $L_2$, the second capacitor $C_2$, and the eighth switching device $Q_8$. Also, the secondary-side current charges the second inductor $L_2$, so that the second inductor $L_2$ stores energy.

<Fourth Time Zone t4>

Figure 6:
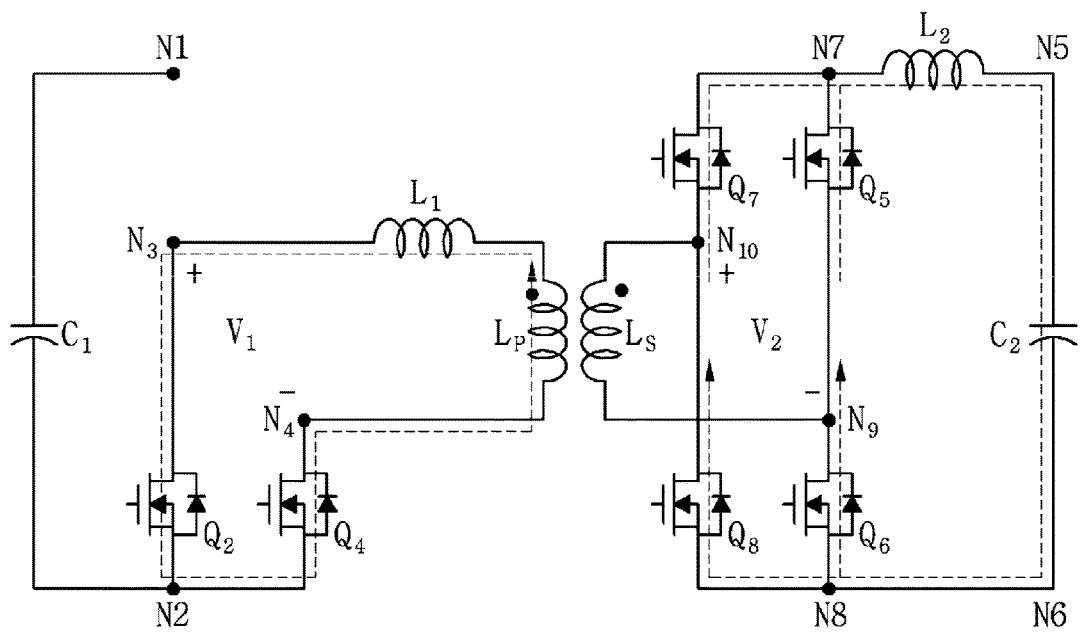

Referring to FIGS. 2 and 6, during a fourth time zone t4, the second switching device $Q_2$ maintains the turn-on state, but the third switching device $Q_3$ is turned off. The fourth switching device $Q_4$, which was in the turn-off state during the third time zone t3, is turned on. The first switching device $Q_1$ maintains the turn-off state. The secondary-side switching devices $Q_5$ to $Q_8$ are all turned on. In this case, the second and fourth switching devices $Q_2$ and $Q_4$ form a primary-side current path, and therefore, the first voltage $V_1$ becomes 0 V as the third and fourth nodes N3 and N4 are short-circuited to each other. In addition, since the secondary-side switching devices $Q_5$ to $Q_8$ are all turned on, the second voltage $V_2$ also becomes 0 V, and the energy stored in the second inductor $L_2$ is transferred to the output terminals N5 and N6.

As an input voltage HV between the input terminals N1 and N2 is stepped down through the transformer T while the above-described operation is being periodically repeated, an output voltage LV is output to the output terminals N5 and N6.

Meanwhile, the turn ratio of the transformer T may be determined based on the input voltage HV, the output voltage LV and a duty ratio. The inductance of the second inductor L2 and the capacitance of the second capacitor C2 may be determined based on ripple sizes of output current and output voltage.

First Step Up Mode

Figure 7:
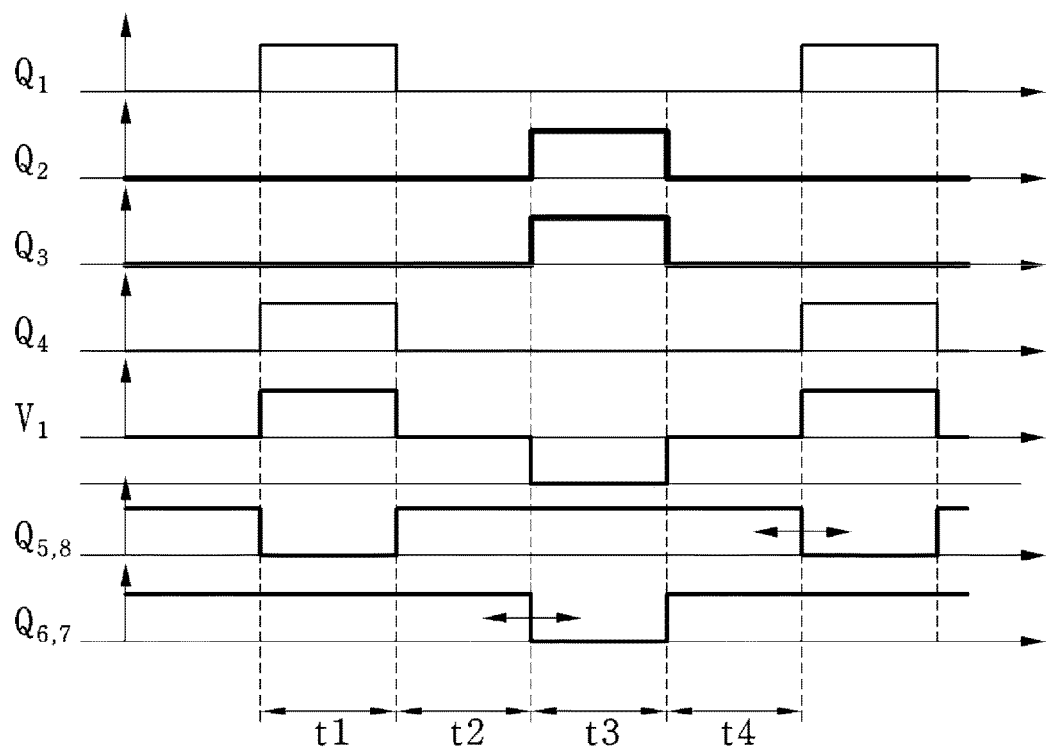
FIG. 7 is a timing diagram in a step up mode.

Hereinafter, an operation in the step up mode will be described with reference to FIGS. 7 to 11. FIG. 7 is a timing diagram in the step up mode. FIGS. 8 to 11 are diagrams illustrating an operation according to the timing diagram of FIG. 7.

<First Time Zone t1>

Figure 8:
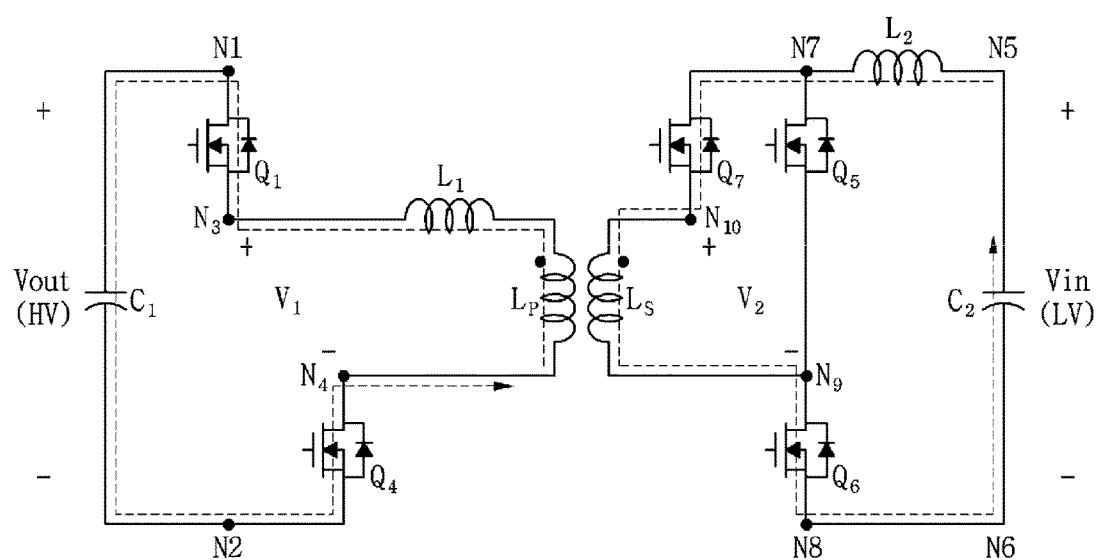
FIGS. 8 to 11 are diagrams illustrating an operation according to the timing diagram of FIG. 7.

Referring to FIGS. 7 and 8, during a first time zone t1, the first and fourth switching devices $Q_1$ and $Q_4$ are turned on, and the second and third switching devices $Q_2$ and $Q_3$ are turned off. In addition, the fifth and eighth switching devices $Q_5$ and $Q_8$ are turned off, and the sixth and seventh switching devices $Q_6$ and $Q_7$ are turned on. In this case, as a current from the second capacitor $C_2$ at the secondary side flows via the second inductor $L_2$, the seventh switching device $Q_7$, the second coil $L_S$, and the sixth switching device $Q_6$, the second voltage $V_2$ becomes a positive voltage. At this time, a current at the secondary side forms a primary-side current on the basis of the turn ratio of the transformer T, and a current from the first inductor $L_P$ at the primary side is charged in the first capacitor $C_1$ while flowing via the first inductor $L_1$, the first switching device $Q_1$, the first capacitor $C_1$, and the fourth switching device $Q_4$.

<Second Time Zone t2>

Figure 9:
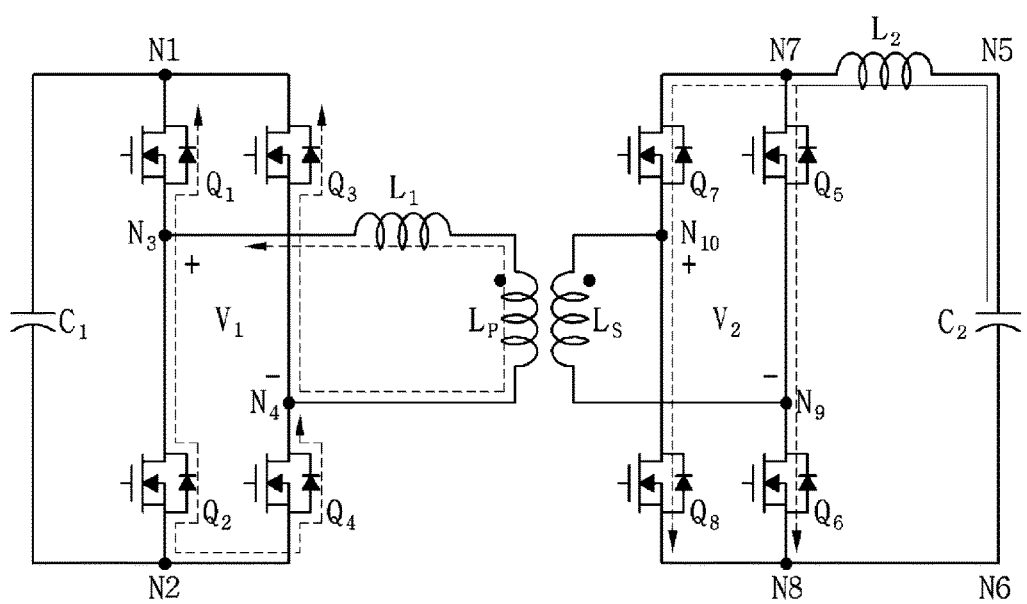

Referring to FIGS. 7 and 9, during a second time zone t2, the first and fourth switching devices $Q_1$ and $Q_4$ are turned off, and the second and third switching devices $Q_2$ and $Q_3$ maintain the turn-off state. In addition, the fifth and eighth switching devices $Q_5$ and $Q_8$ are turned on, and the sixth and seventh switching devices $Q_6$ and $Q_7$ maintain the turn-on state. In this case, since the fifth to eighth switching devices $Q_5$ to $Q_8$ are turned on, the second voltage $V_2$ becomes 0 V, a voltage induced to the first coil $L_P$ at the primary side becomes 0 V, and a current flowing in the first inductor $L_1$ flows in the first capacitor $C_1$ via reverse parallel diodes of the first to fourth switching devices $Q_1$ to $Q_4$. In addition, a current flowing in the second coil $L_S$ decreases and thus becomes a reverse current in the next time zone.

<Third Time Zone t3>

Figure 10:
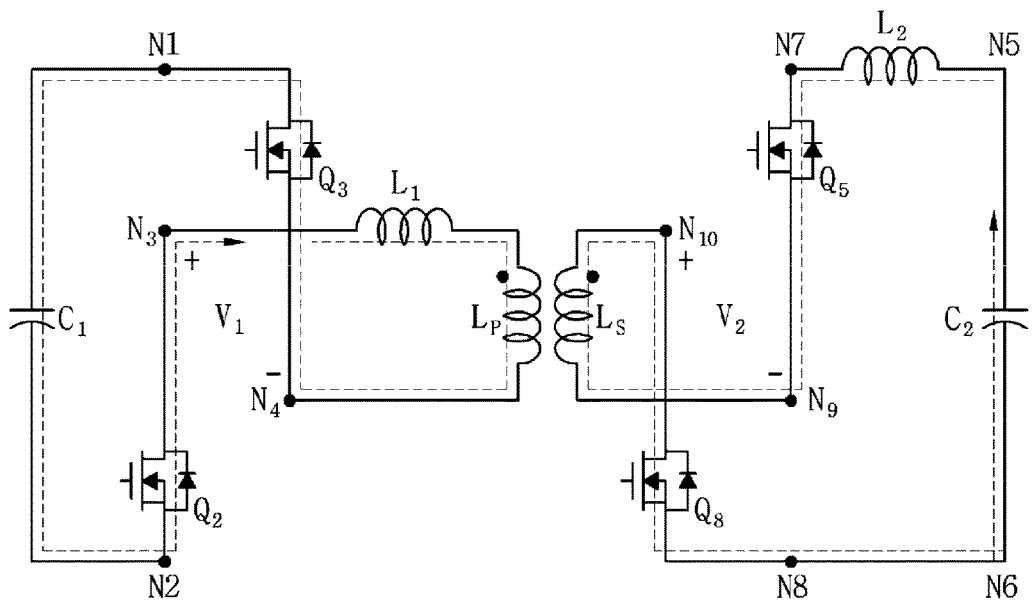

Referring to FIGS. 7 and 10, during a third time zone t3, the first and fourth switching devices $Q_1$ and $Q_4$ maintain the turn-off state, and the second and third switching devices $Q_2$ and $Q_3$ are turned on. In addition, the fifth and eighth switching devices $Q_5$ and $Q_8$ maintain the turn-on state, and the sixth and seventh switching devices $Q_6$ and $Q_7$ are turned off. In this case, as a current from the second capacitor $C_2$ at the secondary side flows via the second inductor $L_2$, the fifth switching device $Q_5$, the second coil $L_S$, and the eighth switching device $Q_8$, the second voltage $V_2$ becomes a negative voltage. At this time, a current from the first coil $L_P$ at the primary side charges the first capacitor $C_1$ while flowing via the first inductor $L_1$, the third switching device $Q_3$, the first capacitor $C_1$, and the second switching device $Q_2$.

<Fourth Time Zone t4>

Figure 11:
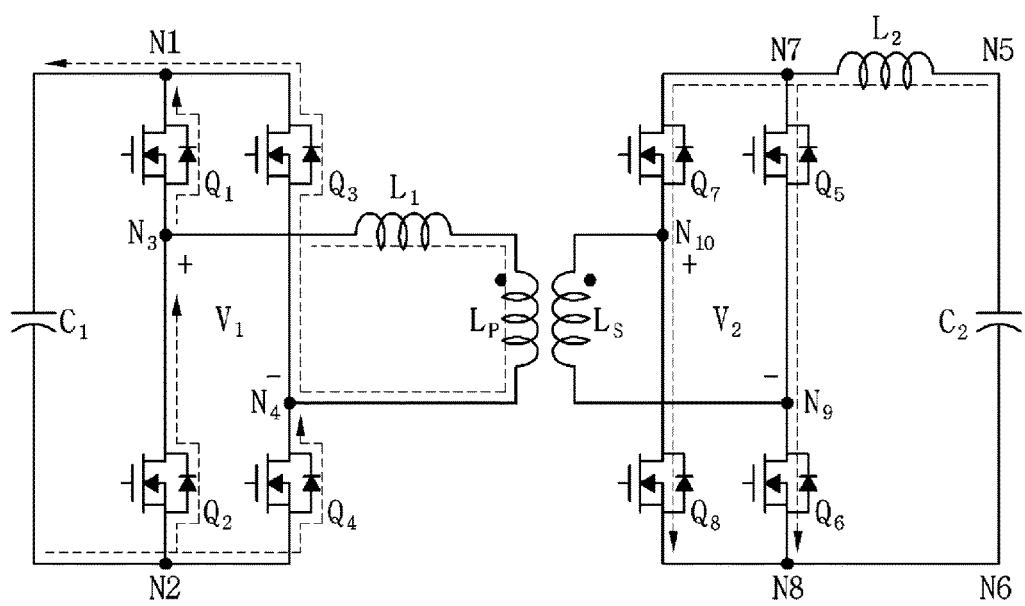

Referring to FIGS. 7 and 11, during a fourth time zone t4, the first and fourth switching devices $Q_1$ and $Q_4$ maintain the turn-off state, and the second and third switching devices $Q_2$ and $Q_3$ are turned off. In addition, the fifth and eighth switching devices $Q_5$ and $Q_8$ maintain the turn-on state, and the sixth and seventh switching devices $Q_6$ and $Q_7$ are turned off. In this case, since the fifth to eighth switching devices $Q_5$ to $Q_8$ are turned off, the second voltage $V_2$ becomes 0 V, a voltage induced to the first coil LP at the primary side becomes 0 V, and a current flowing in the first inductor $L_1$ flows in the first capacitor $C_1$ via the reverse parallel diodes of the first to fourth switching devices $Q_1$ to $Q_4$. In addition, a current flowing in the second coil $L_S$ decreases and thus becomes a reverse current in the next time zone.

As an input voltage LV between the input terminals N5 and N6 is stepped up through the transformer T while the above-described operation is being periodically repeated, an output voltage HV is output to the output terminals N1 and N2.

Meanwhile, when a point of time when the turned-on fifth and eighth switching devices $Q_5$ and $Q_8$ are turned off is adjusted, i.e., when the turn-on time of the fifth and eighth switching devices $Q_5$ and $Q_8$ is increased as shown in an arrow of FIG. 7, the increment of current flowing in the second coil $L_S$ is increases, thereby increasing the charge amount of the first capacitor $C_1$ at the primary side. Corresponding to this, when a point of time when the turned-on sixth and seventh switching devices $Q_6$ and $Q_7$ are turned off is adjusted, i.e., when the turn-on time of the sixth and seventh switching devices $Q_6$ and $Q_7$ is increased as shown in an arrow of FIG. 7, the increment of current flowing in the second coil $L_S$ is increases, thereby increasing the charge amount of the first capacitor $C_1$ at the primary side. By using such a principle, the amplification amount of the input voltage LV is adjusted, thereby outputting the output voltage HV higher than the input voltage LV.

Controller According to First Embodiment

Figure 12:
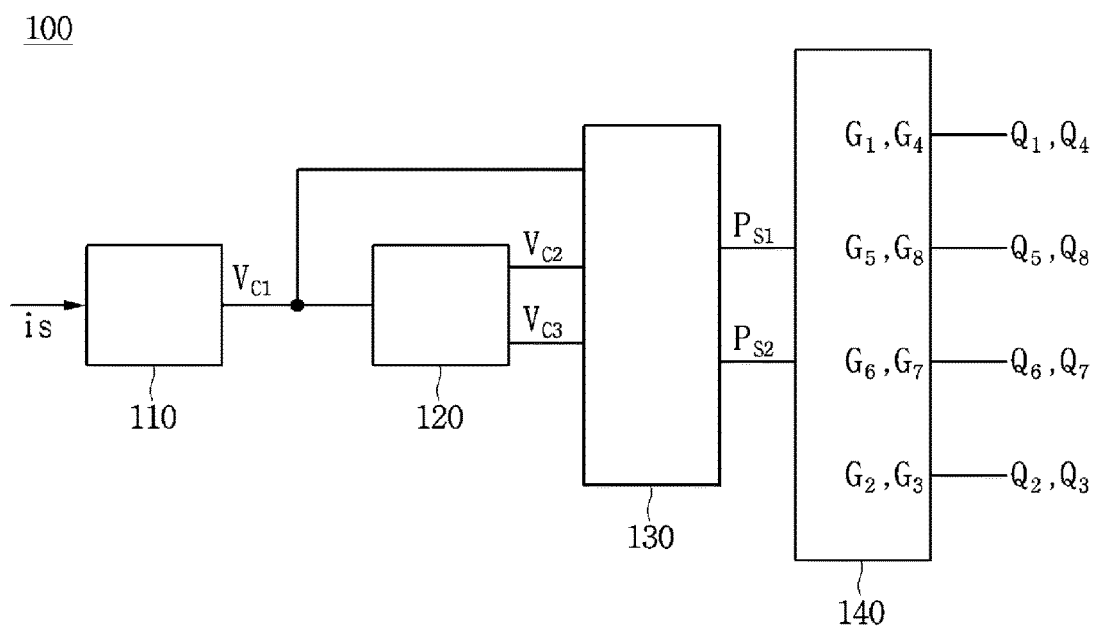
FIG. 12 is a block diagram of a controller for controlling an operation in a boost mode according to a first embodiment.
Figure 13:
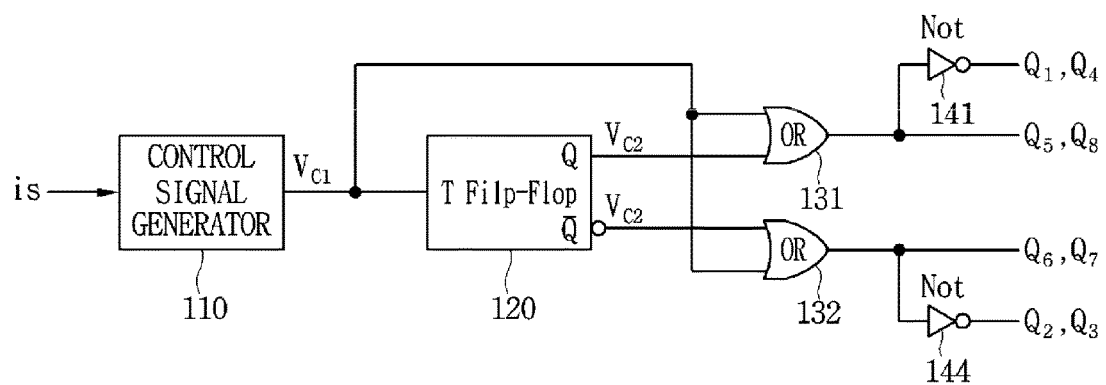
FIG. 13 is a circuit diagram as an example implementing the controller of FIG. 12.
Figure 14:
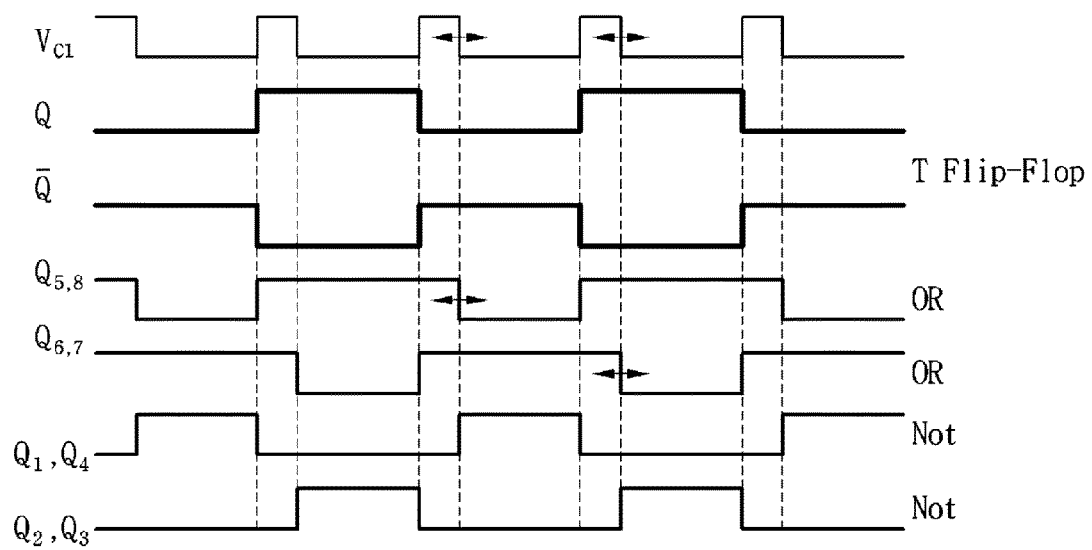
FIG. 14 is a waveform diagram illustrating output signals of the controller.

FIG. 12 is a block diagram of a controller for controlling an operation in a boost mode according to a first embodiment. FIG. 13 is a circuit diagram as an example implementing the controller of FIG. 12. FIG. 14 is a waveform diagram illustrating output signals of the controller.

Referring to FIGS. 12 to 14, the controller 100 according to the first embodiment may include a control signal generator 110, a memory device 120, a first calculator 130, and a second calculator 140.

The control signal generator 110 may include at least one input signal line and one output signal line. The control signal generator 110 may output a first control signal $V_{C1}$ to the output signal line on the basis of a sensing signal is applied to the input signal line. The sensing signal input to the control signal generator 110 may become a current signal flowing in the second inductor $L_2$ at the secondary side. The control signal generator 110 senses the sensing signal is, and may output the first control signal $V_{C1}$ as a pulse signal of which pulse width is adjusted on the basis of the sensing signal is. When the sensing signal increases, the pulse width of the first control signal $V_{C1}$ may decrease. When the sensing signal decreases, the pulse width of the first control signal $V_{C1}$ may increase.

The memory device 120 may include one input signal line and two output signal lines. The memory device 120 may output second and third control signals $V_{C2}$ and $V_{C3}$ having logic levels opposite to each other on the basis of the first control signal $V_{C1}$ applied to the input signal line. The memory device 120 may output, as a current output signal, a second control signal $V_{C2}$ having the opposite logic level to a second control signal $V_{C2}$ in a previous state, in synchronization with a shift of the first control signal $V_{C1}$, i.e., a rising edge. When the logic level of the second control signal $V_{C2}$ is changed, the third control signal $V_{C3}$ may be changed to a signal having the opposite logic level to the second control signal $V_{C2}$. The memory device 120 may be implemented as a T flip-flop as shown in FIG. 13, but the present disclosure is not limited thereto. The memory device 120 may be implemented as any logic device that performs the above-described operation. When the memory device 120 is implemented as the T flip-flop, an input signal of the T flip-flop becomes the first control signal $V_{C1}$, a Q signal becomes the second control signal $V_{C2}$, and a Q bar signal becomes the third control signal $V_{C3}$.

The first operator 130 may include three input signal lines and two output signal lines. The first operator 130 may output a first pulse signal $P_{S1}$ and a second pulse signal $P_{S2}$ on the basis of the first to third control signals $V_{C1}$, $V_{C2}$, and $V_{C3}$ applied to the input signal lines. The first operator 130 may compare the first control signal $V_{C1}$ and the second control signal $V_{C2}$, and, when at least one of the first and second control signals $V_{C1}$ and $V_{C2}$ is a high logic level, output the first pulse signal $P_{S1}$ of the high logic level. The first operator 130 may compare the first control signal $V_{C1}$ and the third control signal $V_{C3}$, and, when at least one of the first and third control signals $V_{C1}$ and $V_{C3}$ is a high logic level, output the second pulse signal $P_{S2}$ of the high logic level. When the first control signal $V_{C1}$ has the high logic level even though the second and third control signals $V_{C2}$ and $V_{C3}$ have a low logic level, the first and second pulse signals $P_{S1}$ and $P_{S2}$ can have the high logic level. Thus, the pulse width of the high logic level of the first and second pulse signals $P_{S1}$ and $P_{S2}$ can be adjusted based on a change in the pulse width of the high logic level of the first control signal $V_{C1}$. The first calculator 130 may be implemented with first and second OR gates 131 and 132, but the present disclosure is not limited thereto. The first calculator 130 may be implemented as any logic device that performs the above-described operation. When the first calculator 130 is implemented with the first and second OR gates 131 and 132, input signals of the first OR gate 131 become the first and second control signals $V_{C1}$ and $V_{C2}$, and an output signal of the first OR gate 131 becomes the first pulse signal $P_{S1}$. Also, input signals of the second OR gate 132 become the first and third control signals $V_{C1}$ and $V_{C3}$, and an output signal of the second OR gate 132 becomes the second pulse signal $P_{S2}$.

The second calculator 140 may include two input signal lines and four output signal lines. The second calculator 140 may output first to eighth gating signals $G_1$, $G_2$, $G_3$, $G_4$, $G_5$, $G_6$, $G_7$, and $G_8$ on the basis of the first and second pulse signals $P_{S1}$ and $P_{S2}$ applied as to the input signal lines. The second calculator 140 may output the first and fourth gating signals $G_1$ and $G_4$ by inverting the first pulse signal $P_{S1}$. The second calculator 140 may output the first pulse signal $P_{S1}$ as the fifth and eighth gating signals $G_5$ and $G_8$. The second calculator 140 may output the second pulse signal $P_{S2}$ as the sixth and seventh gating signals $G_6$ and $G_7$. The second calculator 140 may output the second and third gating signals $G_2$ and G by inverting the second pulse signal $P_{S2}$. The first to eighth gating signals $G_1$ to $G_8$ are control signals for turning on or turning off the first to eight switching devices $Q_1$ to $Q_8$, respectively. The second calculator 140 may be implemented with first and second NOT gates 141 and 142 as shown in FIG. 13, but the present disclosure is not limited thereto. The second calculator 140 may be implemented as any logic device that performs the above-described operation. When the second calculator 140 is implemented with the first and second NOT gates 141 and 142, the first NOT gate 141 outputs the first and fourth gating signals $G_1$ and $G_4$ by inverting the first pulse signal $P_{S1}$, and the second NOT gate 142 outputs the second and third gating signals $G_2$ and $G_3$ by inverting the second pulse signal $P_{S2}$.

Meanwhile, the control signal generator 110 may include two input signal lines to sense, as sensing signals, not only the current is of the second inductor $L_2$ but also an output voltage Vout as a voltage between both terminals of the first capacitor $C_1$ at the primary side, thereby generating the first control signal $V_{C1}$ on the basis of the output voltage Vout and the sensing current is.

The controller 100 varies the pulse width of the high logic level of the first control signal $V_{C1}$ on the basis of the sensing signal is, and accordingly, the pulse width of the high logic level of the secondary-side switching elements is adjusted. Thus, the amplification amount of the input voltage Vin (LV) between the fifth and sixth nodes N5 and N6 can be adjusted in the boost mode, thereby outputting the output voltage Vout (HV) to the first and second nodes N1 and N2. Furthermore, the controller 100 can control a full bridge circuit not through digital signal processing (DSP) but through an analog operation using a simple logical device. Thus, it is possible to decrease the size of the controller 100 and to reduce cost.

Second Embodiment

Figure 15:
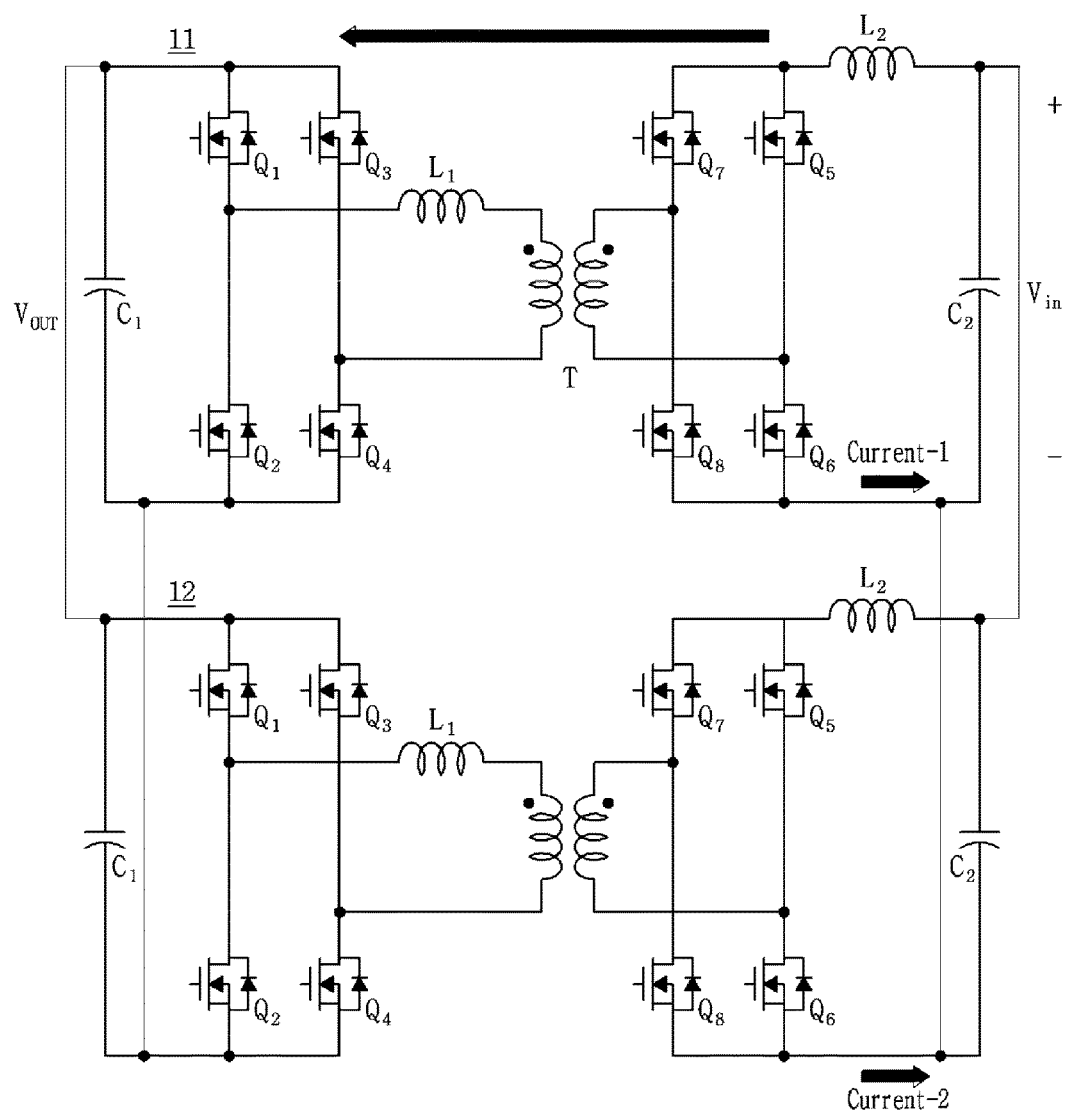
FIG. 15 is a circuit diagram illustrating parallel driving of first and second DC-DC converters according to a second embodiment.
Figure 16:
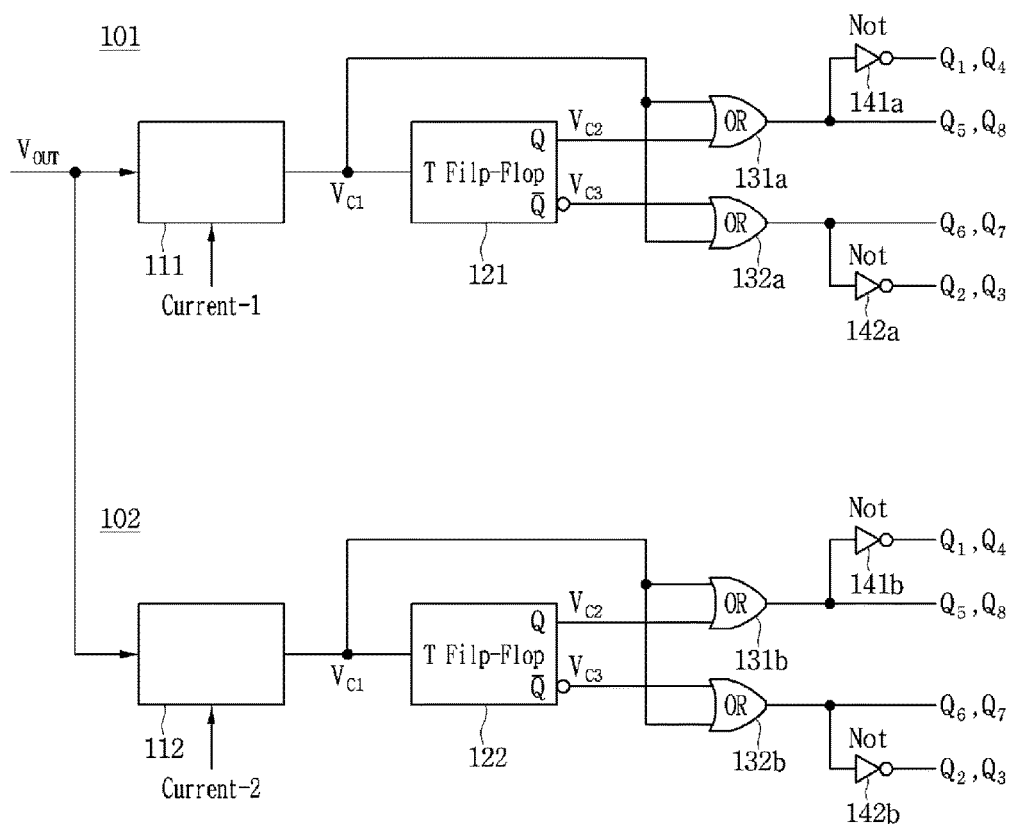
FIG. 16 is a circuit diagram illustrating first and second controllers for controlling the parallel driving of the first and second DC-DC converters.

FIG. 15 is a circuit diagram illustrating parallel driving of first and second bidirectional DC-DC converters according to a second embodiment. FIG. 16 is a circuit diagram illustrating first and second controllers for controlling the parallel driving of the first and second DC-DC converters.

Referring to FIGS. 15 and 16, in the second embodiment, two bidirectional DC-DC converters 10 described above may be used. That is, a first DC-DC converter 11 and a second DC-DC converter 12 are coupled in parallel to each other, and an output voltage Vout (HV) may be output to a primary side by increasing an input voltage Vin (LV) at a secondary side. Two controllers 100 according to the first embodiment may be used to respectively control the first and second DC-DC converters 11 and 12.

A first controller 101 may include a first control signal generator 111 that senses a current flowing in a second inductor $L_2$ of the first DC-DC converter 11 and an output voltage Vout and outputs a first control signal $V_{C1}$ on the basis of the current and the output voltage Vout; a first T flip-flop 121 that outputs, as a Q signal, a second control signal $V_{C2}$ having a logic level opposite to that in a previous state in synchronization with a shift of the first control signal $V_{C1}$ from the first control signal generator 111, and outputs, as a Q bar signal, a third control signal $V_{C3}$ having the opposite logic level to the second control signal $V_{C2}$; a (1-1)th OR gate 131a that outputs a first pulse signal $P_{S1}$ of a first logic level when the first and second control signals $V_{C1}$ and $V_{C2}$ have the first logic level; a (2-1)th OR gate 132a that outputs a second pulse signal $P_{S2}$ of the first logic level when the first and third control signals $V_{C1}$ and $V_{C3}$ have the first logic level; a (1-1)th NOT gate 141a that inverts the first pulse signal $P_{S1}$ and outputs the inverted signal; and a (2-1)th NOT gate 142a that inverts the second pulse signal $P_{S2}$ and outputs the inverted signal. Here, the first logic level may be a high logic level.

A second controller 102 may include a second control signal generator 112 that senses a current flowing in a second inductor $L_2$ of the second DC-DC converter 12 and an output voltage Vout and outputs a first control signal $V_{C1}$ on the basis of the current and the output voltage Vout; a first T flip-flop 121 that outputs, as a Q signal, a second control signal $V_{C2}$ having a logic level opposite to that in a previous state in synchronization with a shift of the first control signal $V_{C1}$ from the second control signal generator 112, and outputs, as a Q bar signal, a third control signal $V_{C3}$ having the opposite logic level to the second control signal $V_{C2}$; a (1-2)th OR gate 131b that outputs a first pulse signal $P_{S1}$ of a first logic level when the first and second control signals $V_{C1}$ and $V_{C2}$ have the first logic level; a (2-2)th OR gate 132b that outputs a second pulse signal $P_{S2}$ of the first logic level when the first and third control signals $V_{C1}$ and $V_{C3}$ have the first logic level; a (1-2)th NOT gate 141b that inverts the first pulse signal $P_{S1}$ and outputs the inverted signal; and a (2-2)th NOT gate 142b that inverts the second pulse signal $P_{S2}$ and outputs the inverted signal. Here, the first logic level may be a high logic level.

As described above, the first and second bidirectional DC-DC converters 11 and 12 are coupled in parallel to each other, and switching devices in each of the converters are controlled by sensing the output voltage Vout of the converters and a sensing current of each of the converters. Thus, each of the converters eliminates a voltage or current bias phenomenon, thereby uniformly amplifying and outputting the input voltage Vin of each of the converters.

Second Step Up Mode

Hereinafter, an operation in a second step up mode will be described with reference to FIGS. 17 to 21.

Figure 17:
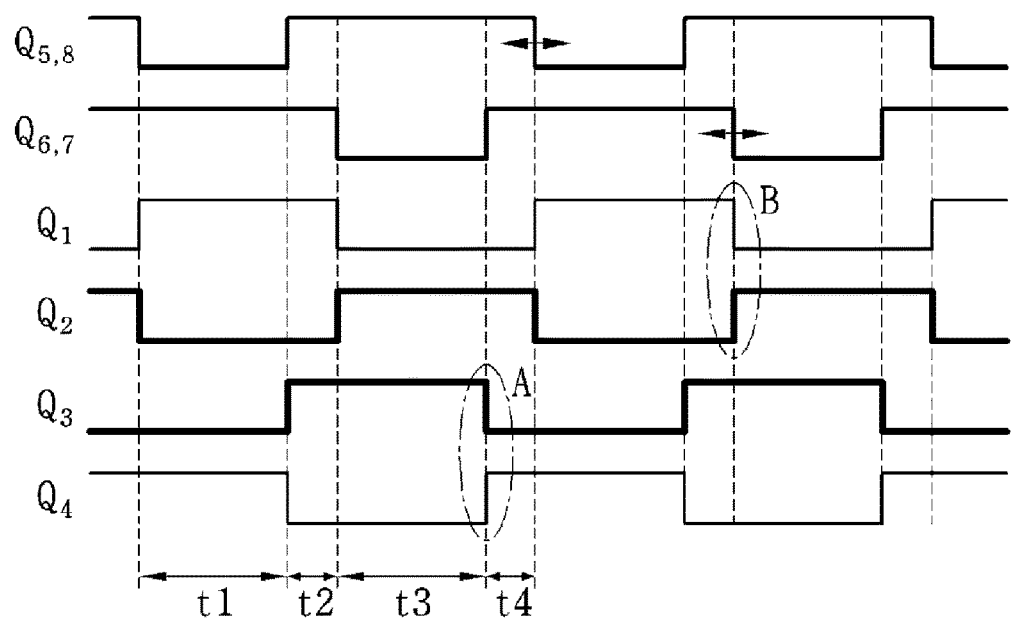
FIG. 17 is a timing diagram illustrating an operation in a step up mode.

FIG. 17 is a timing diagram illustrating an operation in the step up mode. FIGS. 18 to 21 are diagrams illustrating an operation according to the timing diagram of FIG. 17.

<First Time Zone t1>

Figure 18:
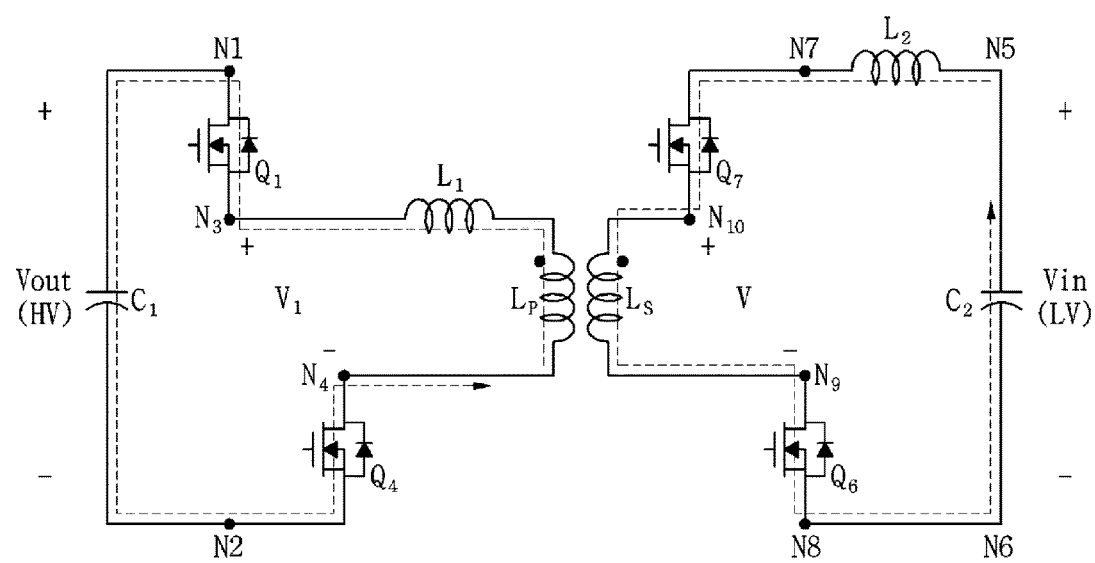
FIGS. 18 to 21 are diagrams illustrating an operation according to the timing diagram of FIG. 17.

Referring to FIGS. 17 and 18, a first time zone t1 is a power transfer zone. During the first time zone t1, the first and fourth switching devices $Q_1$ and $Q_4$ are turned on, and the second and third switching devices $Q_2$ and $Q_3$ are turned off. In addition, the fifth and eight switching devices $Q_5$ and $Q_8$ are turned off, and the sixth and seventh switching devices $Q_6$ and $Q_7$ are turned on. In this case, as the second inductor $L_2$ is discharged, a current from the second capacitor $C_2$ at the secondary side flows via the second inductor $L_2$, the seventh switching device $Q_7$, the second coil $L_S$, and the sixth switching device $Q_6$, and the second voltage $V_2$ becomes a positive voltage. At this time, a current from the first inductor $L_P$ at the primary side charges the first capacitor $C_1$ while being flowed by the transformer T via the first inductor $L_1$, the first switching device $Q_1$, the first capacitor $C_1$, and the fourth switching device $Q_4$. That is, during the first time zone t1, the input voltage Vin at the secondary side is stepped up through the transformer T and output as the output voltage Vout to the secondary side.

<Second Time Zone t2>

Figure 19:
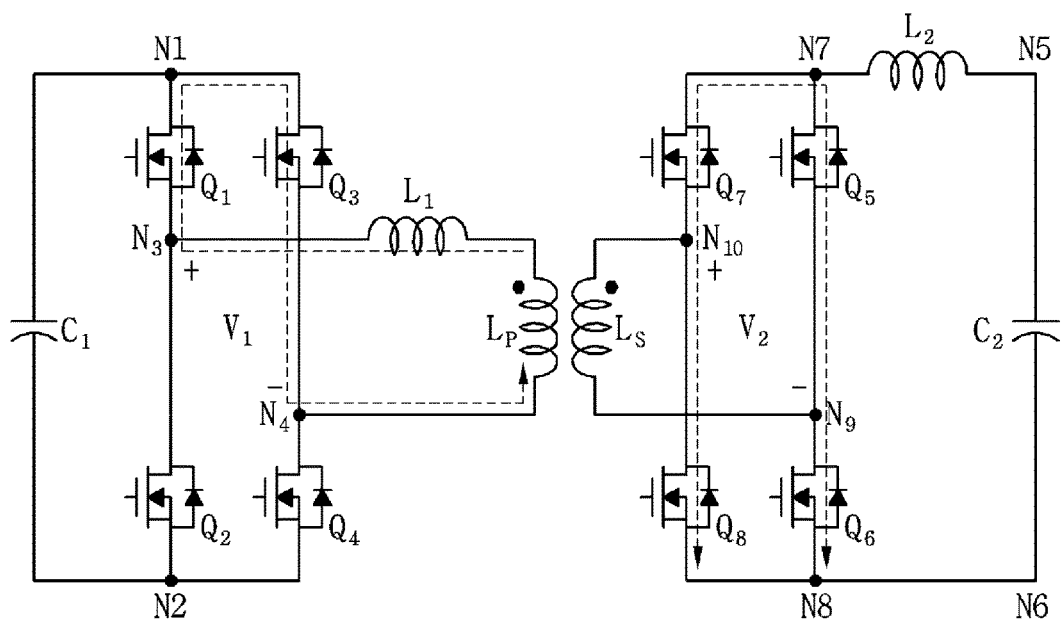

Referring to FIGS. 17 and 19, a second time zone t2 is a freewheeling zone. During the second time zone t2, the first switching device $Q_1$ maintains the turn-on state, the third switching device $Q_3$ is turned on, the second switching device $Q_2$ maintains the turn-off state, and the fourth switching device $Q_4$ is turned off. In addition, the fifth and eight switching devices $Q_5$ and $Q_8$ are turned on, and the sixth and seventh switching devices $Q_6$ and $Q_7$ maintain the turn-on state. In this case, the second inductor $L_2$ is charged by the input voltage Vin, and the fifth to eighth switching devices $Q_5$ to $Q_8$ are turned on. Therefore, the second voltage $V_2$ becomes 0 V, and the current flowing in the second coil $L_2$ decreases and thus becomes a reverse current in the next time zone. In addition, the current flowing in the first inductor $L_1$ flows via the first and third switching devices $Q_1$ and $Q_3$, and therefore, the first voltage $V_1$ becomes 0 V.

<Third Time Zone t3>

Figure 20:
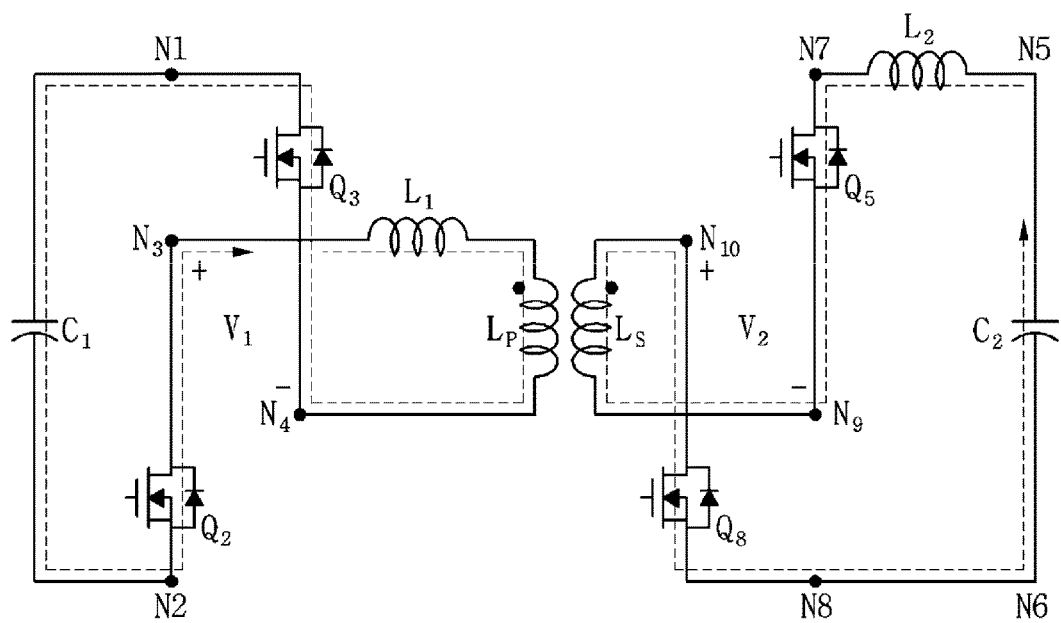

Referring to FIGS. 17 and 20, a third time zone t3 is a power transfer zone. During the third time zone t3, the first switching device $Q_1$ is turned off, the fourth switching device $Q_4$ maintains the turn-off state, the second switching device $Q_2$ is turned on, and the third switching device $Q_3$ maintains the turn-on state. In addition, the fifth and eight switching devices $Q_5$ and $Q_8$ maintain the turn-on state, and the sixth and seventh switching devices $Q_6$ and $Q_7$ are turned off. In this case, as the second inductor $L_2$ is discharged, a current from the second capacitor $C_2$ at the secondary side flows via the second inductor $L_2$, the fifth switching device $Q_5$, the second coil $L_S$, and the eighth switching device $Q_8$, and the second voltage $V_2$ becomes a negative voltage. At this time, a current of the first coil $L_P$ at the primary side charges the first capacitor $C_1$ while being flowed by the transformer T via the first inductor $L_1$, the third switching device $Q_3$, the first capacitor $C_1$, and the second switching device $Q_2$. That is, during the third time zone t3, the input voltage Vin at the secondary side is stepped up through the transformer T and output as the output voltage Vout to the secondary side.

<Fourth Time Zone t4>

Figure 21:
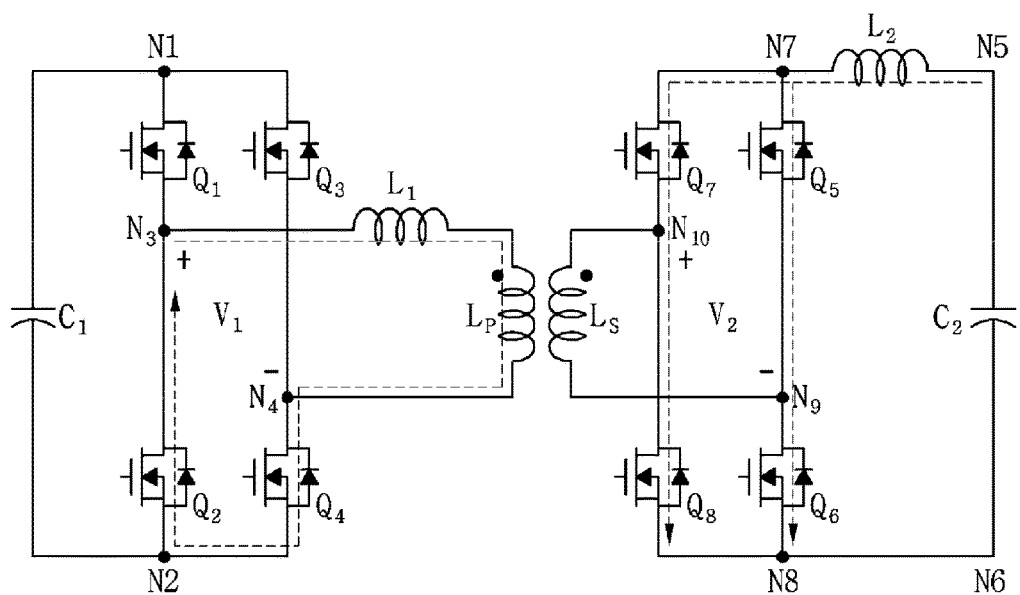

Referring to FIGS. 17 and 21, a fourth time zone t4 is a freewheeling zone. During the fourth time zone t4, the first switching device $Q_1$ maintains the turn-off state, the fourth switching device $Q_4$ is turned on, the second switching device $Q_2$ maintains the turn-on state, and the third switching device $Q_3$ is turned off. In addition, the fifth and eight switching devices $Q_5$ and $Q_8$ maintain the turn-on state, and the sixth and seventh switching devices $Q_6$ and $Q_7$ are turned on. In this case, the second inductor $L_2$ is charged by the input voltage Vin, and the fifth to eighth switching devices $Q_5$ to $Q_8$ are turned on. Therefore, the second voltage $V_2$ becomes 0 V, and the current flowing in the second coil $L_S$ decreases and thus becomes a forward current in the next time zone. In addition, current flowing in the first inductor $L_1$ flows via the first and second switching devices $Q_1$ and $Q_2$, and therefore, the first voltage V1 becomes 0 V.

As an input voltage LV between the input terminals N5 and N6 is stepped up through the transformer T while the above-described operation is being periodically repeated, an output voltage HV is output to the output terminals N1 and N2.

Meanwhile, when a point of time when the turned-on fifth and eighth switching devices $Q_5$ and $Q_8$ are turned off is adjusted, i.e., when the turn-on time of the fifth and eighth switching devices $Q_5$ and $Q_8$ is increased, the increment of current flowing in the second coil $L_S$ is increases, thereby increasing the charge amount of the first capacitor $C_1$ at the primary side. Corresponding to this, when a point of time when the turned-on sixth and seventh switching devices $Q_6$ and $Q_7$ are turned off is adjusted, i.e., when the turn-on time of the sixth and seventh switching devices $Q_6$ and $Q_7$ is increased, the increment of current flowing in the second coil $L_S$ is increases, thereby increasing the charge amount of the first capacitor $C_1$ at the primary side. By using such a principle, the amplification amount of the input voltage Vin (LV) is adjusted, thereby outputting the output voltage Vout (HV) higher than the input voltage LV.

Controller According to Third Embodiment

Figure 22:
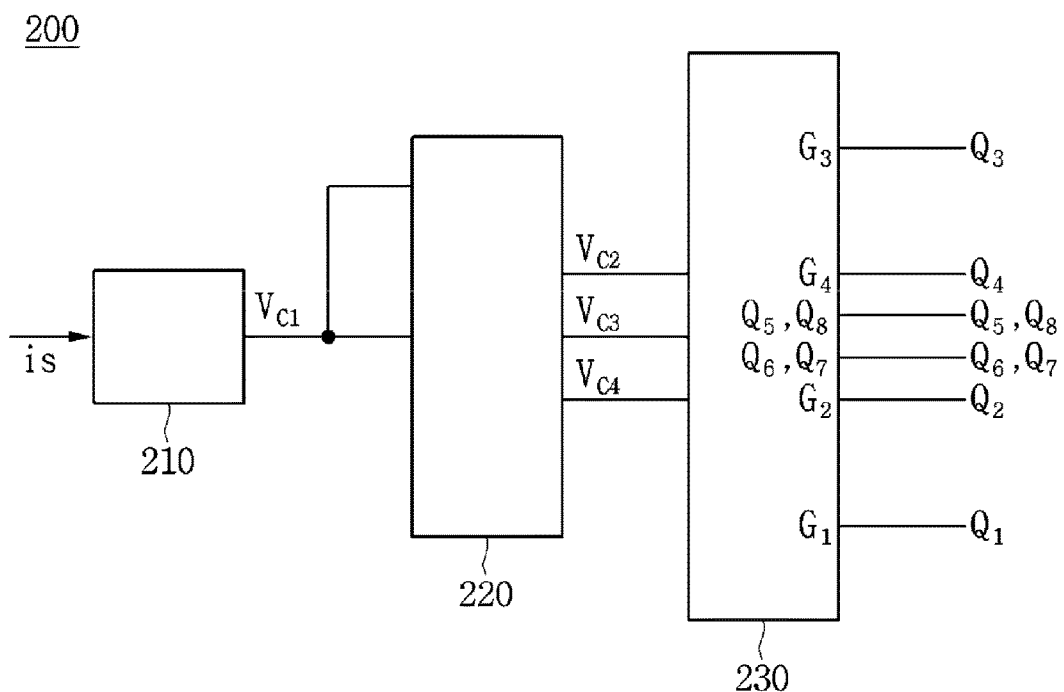
FIG. 22 is a block diagram of a controller for controlling an operation in a boost mode according to a third embodiment.
Figure 23:
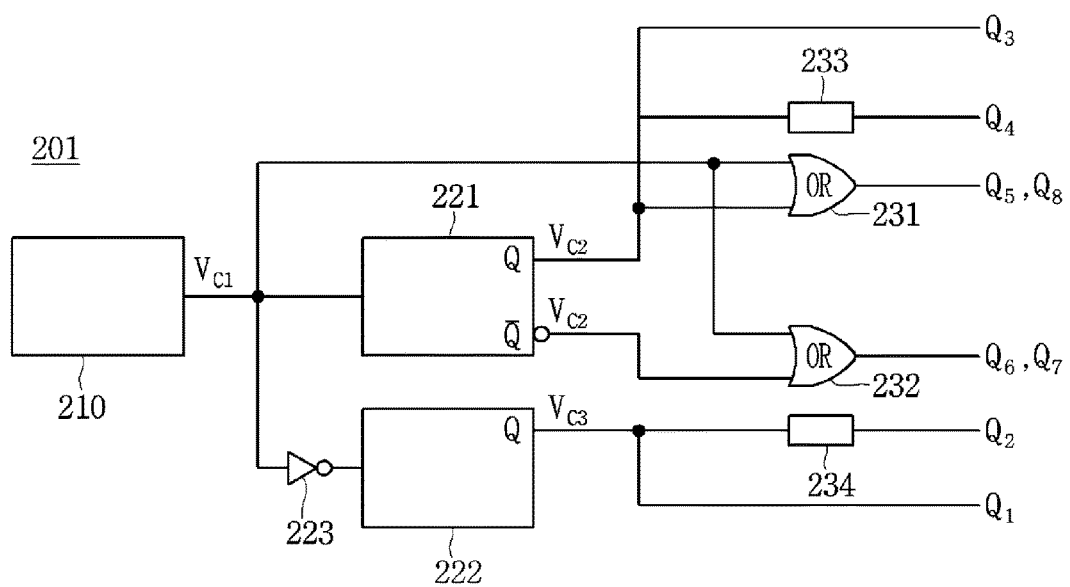
FIG. 23 is a circuit diagram as an example implementing the controller of FIG. 22.
Figure 24:
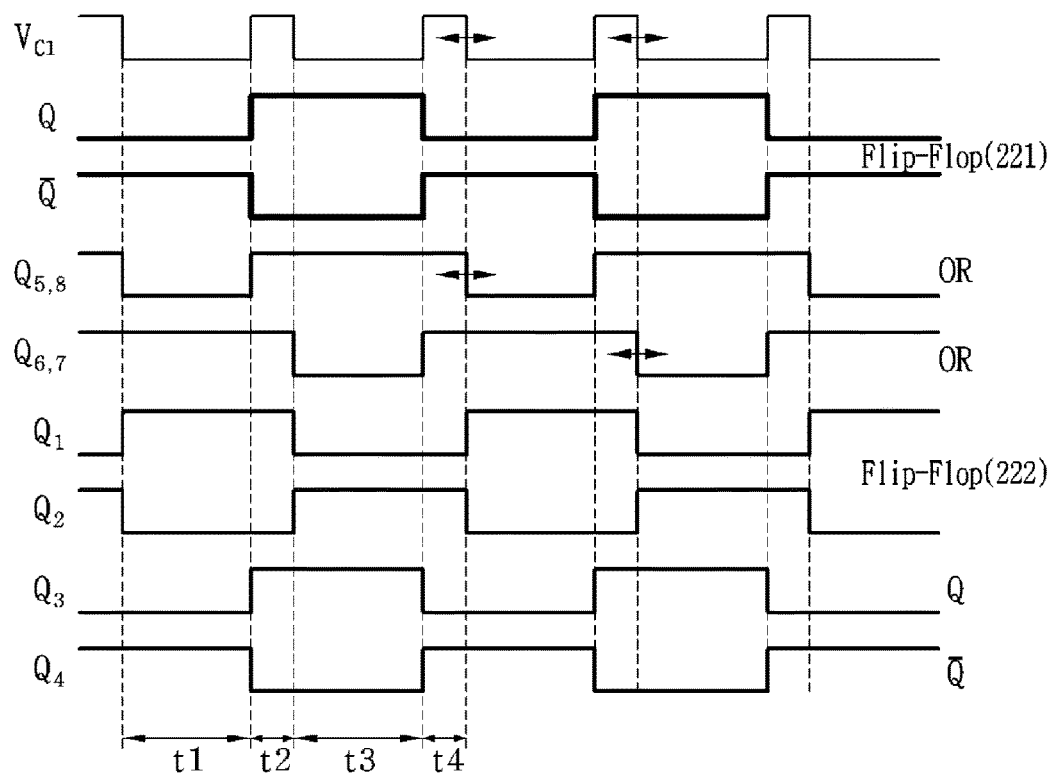
FIG. 24 is a waveform diagram illustrating output signals of the controller.

FIG. 22 is a block diagram of a controller for controlling an operation in a boost mode according to a third embodiment. FIG. 23 is a circuit diagram as an example implementing the controller of FIG. 22. FIG. 24 is a waveform diagram illustrating output signals of the controller.

Referring to FIGS. 22 to 24, the controller 200 according to the second embodiment may include a control signal generator 210, a memory device 220, and a calculator 230.

The control signal generator 210 may include at least one input signal line and one output signal line. The control signal generator 210 may output a first control signal $V_{C1}$ to the output signal line on the basis of a sensing signal is applied to the input signal line. The sensing signal is input to the control signal generator 210 may become a current signal flowing in the second inductor $L_2$ at the secondary side. The control signal generator 210 senses the sensing signal is, and may output the first control signal $V_{C1}$ as a pulse signal of which pulse width is adjusted on the basis of the sensing signal is. When the sensing signal is increases, the pulse width of the first control signal $V_{C1}$ may decrease. When the sensing signal is decreases, the pulse width of the first control signal $V_{C1}$ may increase.

The memory device 220 may include one input signal line and three output signal lines. The memory device 120 may output second and third control signals $V_{C2}$ and $V_{C3}$ having logic levels opposite to each other and a fourth control signal $V_{C4}$ obtained by shifting the phase of the third control signal $V_{C3}$ on the basis of the first control signal $V_{C1}$ applied to the input signal line. The memory device 220 may output, as a current output signal, a second control signal $V_{C2}$ having the opposite logic level to a second control signal $V_{C2}$ in a previous state, in synchronization with a rising edge of the first control signal $V_{C1}$. When the logic level of the second control signal $V_{C2}$ is changed, the third control signal $V_{C3}$ may be changed to a signal having the opposite logic level to the second control signal $V_{C2}$. In addition, the memory device 220 may output, as a current output signal, a fourth control signal $V_{C4}$ having the opposite logic level to a fourth control signal $V_{C4}$ in a previous state, in synchronization with a falling edge of the first control signal $V_{C1}$. The memory device 220 may be implemented as a T flip-flop as shown in FIG. 23, but the present disclosure is not limited thereto. The memory device 220 may be implemented as any logic device that performs the above-described operation. When the memory device 220 is implemented as the T flip-flop, the memory device 220 includes a first T flip-flop 221 and a second T flip-flop 222, and may further include a first NOT gate 223. An input signal of the first T flip-flop 221 becomes the first control signal $V_{C1}$, a Q signal becomes the second control signal $V_{C2}$, and a Q bar signal becomes the third control signal $V_{C3}$. In addition, an input signal of the second T flip-flop 222 becomes a signal obtained by inverting the first control signal $V_{C1}$ through the first NOT gate 223, and a Q signal becomes the fourth control signal $V_{C4}$.

The calculator 230 may include four input signal lines and six output signal lines. The calculator 230 may output first to eighth gating signals $G_1$, $G_2$, $G_3$, $G_4$, $G_5$, $G_6$, $G_7$, and $G_8$ on the basis of the first to fourth control signals $V_{C1}$, $V_{C2}$, $V_{C3}$, and $V_{C4}$ applied to the input signal lines. Specifically, the calculator 230 may output the fifth and eighth gate signals $G_5$ and $G_8$ having a high logic level when at least one of the first and second control signals $V_{C1}$ and $V_{C2}$ has the high logic level, based on the first and second control signals $V_{C1}$ and $V_{C2}$. Also, the calculator 230 may output the sixth and seventh gate signals $G_6$ and $G_7$ having the high logic level when at least one of the first and third control signals $V_{C1}$ and $V_{C3}$ has the high logic level, based on the first and third control signals $V_{C1}$ and $V_{C3}$. Also, the calculator 230 may output the second control signal $V_{C2}$ as the third and fourth gating signals $G_3$ and $G_4$. At this time, the width of a time zone where the second control signal $V_{C2}$ has the high logic level is changed, and the second control signal $V_{C2}$ is output as the fourth gating signal $G_4$, thereby implementing a dead time. Also, the calculator 230 may output the fourth control signal $V_{C4}$ as the first and second gating signals $G_1$ and $G_2$. At this time, the width of a time zone where the fourth control signal $V_{C4}$ has the high logic level is changed, and the fourth control signal $V_{C4}$ is output as the second gating signal $G_4$, thereby implementing a dead time. The calculator 230, as shown in FIG. 23, may be implemented with first and second OR gates 231 and 232 and first and second dead time setting units 233 and 234, but the present disclosure is not limited thereto. The calculator 230 may be implemented as any logic device that performs the above-described operation. When the calculator 230 is implemented with the first and second OR gates 231 and 232 and the first and second dead time setting units 233 and 234, an input signal of the first OR gate 231 becomes the first and second control signals $V_{C1}$ and $V_{C2}$, and an output signal of the first OR gate 231 becomes the fifth and eighth gating signals $G_5$ and $G_8$. Also, an input signal of the second OR gate 232 becomes the first and third control signals $V_{C1}$ and $V_{C3}$, and an output signal of the second OR gate 232 becomes the sixth and seventh gating signals $G_6$ and $G_7$. An input signal of the first dead time setting unit 233 becomes the second control signal $V_{C2}$, and an output signal of the first dead time setting unit 233 becomes the fourth gating signal $G_4$. Also, an input signal of the second dead time setting unit 234 becomes the fourth control signal $V_{C4}$, and an output signal of the second dead time setting unit 234 becomes the second gating signal $G_2$.

The controller 200 varies the pulse width of the high logic level of the first control signal $V_{C1}$ on the basis of the sensing signal is, and accordingly, the pulse width of the high logic level of the secondary-side switching elements is adjusted. Thus, the amplification amount of the input voltage Vin (LV) between the fifth and sixth nodes N5 and N6 can be adjusted in the boost mode, thereby outputting the output voltage Vout (HV) to the first and second nodes N1 and N2.

Meanwhile, the control signal generator 210 may include two input signal lines to sense, as sensing signals, not only the current is of the second inductor $L_2$ but also an output voltage Vout as a voltage between both terminals of the first capacitor $C_1$ at the primary side, thereby generating the first control signal $V_{1i}$ on the basis of the output voltage Vout and the sensing current is.

<Implementation of Zero Voltage Switching According to Operation of Dead Time Setting Unit>

Meanwhile, the first dead time setting unit 233 may adjust a point of time when the fourth gating signal $G_4$ is turned on or turned off by decreasing the pulse width of the high logic level of the fourth gating signal $G_4$. If the fourth gating signal $G_4$ has the high logic level after a certain time elapses after the third gating signal $G_3$ has the low logic level in a time zone indicated (A) by a dotted line in FIG. 17, a charged parasitic capacitor of the fourth switching device $Q_4$ is discharged, so that the voltage between both terminals of the parasitic capacitor is decreased to be equal to or smaller than the threshold voltage of a reverse parallel diode of the fourth switching device $Q_4$. Then, the reverse parallel diode is turned on, and thus the fourth switching device $Q_4$ is turned on, so that it is possible to implement zero voltage switching of the fourth switching device $Q_4$. In addition, the third switching device $Q_3$ is turned on after a certain time elapses after the fourth gating signal $G_4$ has the low logic level by advancing a point of time when the fourth gating signal $G_4$ has the low logic level, so that it is possible to implement zero voltage switching of the third switching device $Q_3$ in the same manner.

Similarly, the second dead time setting unit 234 may adjust a point of time when the second gating signal $G_2$ is turned on or turned off by decreasing the pulse width of the high logic level of the second gating signal $G_2$. If the second gating signal $G_2$ has the high logic level, i.e., if the second switching device $Q_2$ is turned on after a certain time elapses after the first gating signal $G_1$ has the low logic level, i.e., after the first switching device $Q_1$ is turned off in a time zone indicated (B) by a dotted line in FIG. 17, a charged parasitic capacitor of the second switching device $Q_2$ is discharged, so that the voltage between both terminals of the parasitic capacitor is decreased to be equal to or smaller than the threshold voltage of a reverse parallel diode of the second switching device $Q_2$. Then, the reverse parallel diode is turned on, and thus the second switching device $Q_2$ is turned on, so that it is possible to implement zero voltage switching of the second switching device $Q_2$. In addition, the first switching device $Q_1$ is turned on after a certain time elapses after the second gating signal $G_2$ has the low logic level by advancing a point of time when the second gating signal $G_2$ has the low logic level, so that it is possible to implement zero voltage switching of the first switching device $Q_1$ in the same manner. As described above, the zero voltage switching is implemented, so that it is possible to reduce switching loss and to improve the efficiency of power conversion.

Fourth Embodiment

Figure 25:
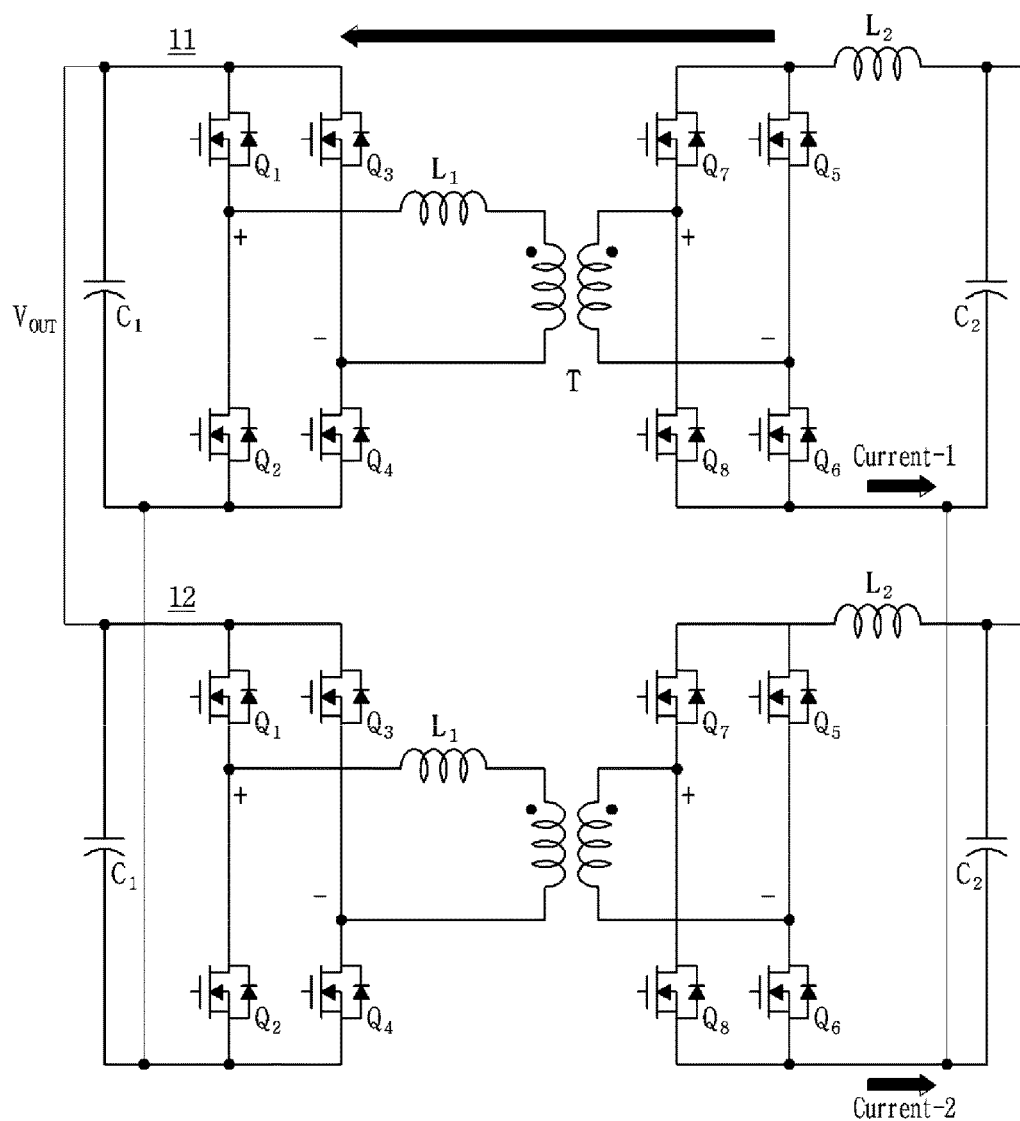
FIG. 25 is a circuit diagram illustrating parallel driving of first and second DC-DC converters according to a fourth embodiment.
Figure 26:
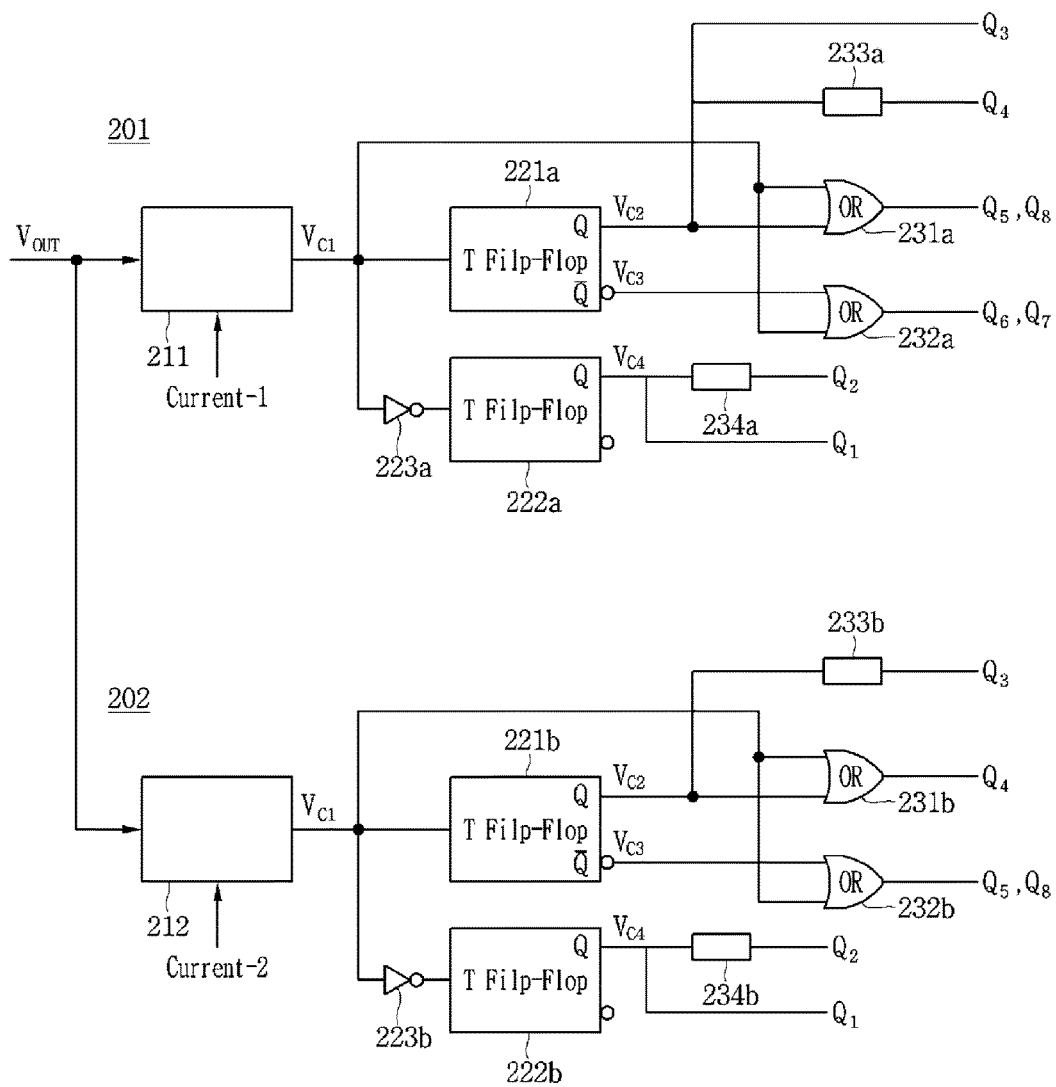
FIG. 26 is a circuit diagram illustrating first and second controllers for controlling the parallel driving of the first and second DC-DC converters.

FIG. 25 is a circuit diagram illustrating parallel driving of first and second bidirectional DC-DC converters according to a fourth embodiment. FIG. 26 is a circuit diagram illustrating first and second controllers for controlling the parallel driving of the first and second DC-DC converters.

Referring to FIGS. 25 and 26, in the fourth embodiment, two bidirectional DC-DC converters 10 described above may be used. That is, a first DC-DC converter 11 and a second DC-DC converter 12 are coupled in parallel to each other, and an output voltage Vout (HV) may be output to a primary side by increasing an input voltage Vin (LV) in a secondary side. Two controllers 200 according to the third embodiment may be used to respectively control the first and second DC-DC converters 11 and 12.

A first controller 201 may include a first control signal generator 211 that senses a current flowing in a second inductor $L_2$ of the first DC-DC converter 11 and an output voltage Vout and outputs a first control signal $V_{C1}$ on the basis of the current and the output voltage Vout; (1-1)th and (2-1)th T flip-flops 221a and 222a that respectively output, as Q signals, second and fourth control signals $V_{C2}$ and $V_{C4}$ having a logic level opposite to that in a previous state in synchronization with a shift of the first control signal $V_{C1}$ from the first control signal generator 211, the (1-1)th T flip-flop outputting, as a Q bar signal, a third control signal $V_{C3}$ having the opposite logic level to the second control signal $V_{C2}$; a (1-1)th OR gate 231a that outputs fifth and eighth gate signals $G_5$ and $G_8$ having a high logic level, which respectively controls fifth and eighth switching devices $Q_5$ and $Q_8$ of the first DC-DC converter 11 when the first and second signals $V_{C1}$ and $V_{C2}$ have the high logic level; a (2-1)th OR gate 232a that outputs sixth and seventh gate signals $G_6$ and $G_7$ having the high logic level, which respectively controls sixth and seventh switching devices $Q_6$ and $Q_7$ of the first DC-DC converter 11 when the first and third signals $V_{C1}$ and $V_{C3}$ have the high logic level; (1-1)th and (2-1)th dead time setting units 233a and 234a that respectively output fourth and second gating signals $G_4$ and $G_2$ for controlling fourth and second switching devices $Q_4$ and $Q_2$ of the first DC-DC converter 11 by setting dead times of the second and fourth control signals $V_{C2}$ and $V_{C4}$; and a first NOT gate 223a that inverts the first control signal $V_{C1}$ and outputs the inverted signal to the (2-1) T flip-flop 222a.

A second controller 202 may include a second control signal generator 212 that senses a current flowing in a second inductor $L_2$ of the second DC-DC converter 12 and an output voltage Vout and outputs a first control signal $V_{C1}$ on the basis of the current and the output voltage Vout; (1-2)th and (2-2)th T flip-flops 221b and 222b that respectively output, as Q signals, second and fourth control signals $V_{C2}$ and $V_{C4}$ having a logic level opposite to that in a previous state in synchronization with a shift of the first control signal $V_{C1}$ from the second control signal generator 212, the (1-1)th T flip-flop outputting, as a Q bar signal, a third control signal $V_{C3}$ having the opposite logic level to the second control signal $V_{C2}$; a (1-2)th OR gate 231b that outputs fifth and eighth gate signals $G_5$ and $G_8$ having a high logic level, which respectively controls fifth and eighth switching devices $Q_5$ and $Q_8$ of the second DC-DC converter 12 when the first and second signals $V_{C1}$ and $V_{C2}$ have the high logic level; a (2-2)th OR gate 232b that outputs sixth and seventh gate signals $G_6$ and $G_7$ having the high logic level, which respectively controls sixth and seventh switching devices $Q_6$ and $Q_7$ of the second DC-DC converter 12 when the first and third signals $V_{C1}$ and $V_{C3}$ have the high logic level; (1-2)th and (2-2)th dead time setting units 233b and 234b that respectively output fourth and second gating signals $G_4$ and $G_2$ for controlling fourth and second switching devices $Q_4$ and $Q_2$ of the second DC-DC converter 12 by setting dead times of the second and fourth control signals $V_{C2}$ and $V_{C4}$; and a second NOT gate 223b that inverts the first control signal $V_{C1}$ and outputs the inverted signal to the (2-2) T flip-flop 222b. As described above, the first and second bidirectional DC-DC converters 11 and 12 are coupled in parallel to each other, and switching devices in each of the converters are controlled by sensing the output voltage Vout of the converters and a sensing current of each of the converters. Thus, each of the converters eliminates a voltage or current bias phenomenon, thereby uniformly amplifying and outputting the input voltage Vin of each of the converters.

The bidirectional DC-DC converter 10 according to the embodiment can be used in an electronic device such as a portable electronic device. Also, the bidirectional DC-DC converter 10 according to the embodiment can be used in a system that charges a load for a certain period of time and boosts energy regenerated from the charged load. Further, the bidirectional DC-DC converter 10 according to the embodiment can also be used in an electric vehicle (EV) and an energy storage system (ESS) as well as a compact battery. Also, the bidirectional DC-DC converter 10 according to the embodiment can be used in a power source device for LEDs. In addition, the bidirectional DC-DC converter 10 according to the embodiment can be used when a DC voltage instead of a voltage of a battery is to be supplied to an internal circuit of a portable electronic device operated using power from the battery provided as a power source.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A bidirectional DC-DC converter comprising:
   a transformer;
   a primary-side full bridge circuit coupled to a primary side of the transformer, the primary-side full bridge circuit having first and second switching devices of a first leg and third and fourth switching devices of a second leg;
   a secondary-side full bridge circuit coupled to a secondary side of the transformer, the secondary-side full bridge circuit having fifth and sixth switching devices of a third leg and seventh and eighth switching devices of a fourth leg;
   a first capacitor coupled to the primary-side full bridge circuit;
   a second capacitor coupled to the secondary-side full bridge circuit; and
   a controller for controlling the primary-side and secondary-side full bridge circuits,
   wherein the controller comprises:
   a control signal generator for outputting a first control signal on the basis of a sensing signal;
   a memory device for outputting a second control signal having a logic level opposite to a previous logic level and a third control signal having the opposite logic level to the second control signal in synchronization with a shift of the first control signal;
   a first calculator for outputting a pulse signal having a first logic level when at least one of the first and second control signals has the first logic level and outputting a second pulse having the first logic level when at least one of the first and third control signals has the first logic level; and
   a second calculator for outputting first to eighth gating signals for respectively controlling the first to eight switching devices on the basis of the first and second pulse signals.

2. The bidirectional DC-DC converter according to claim 1, further comprising:
   a first inductor coupled between the primary-side full bridge circuit and the primary side of the transformer; and
   a second inductor coupled between the secondary-side full bridge circuit and the second capacitor.

3. The bidirectional DC-DC converter according to claim 2, wherein the sensing signal is a sensing current flowing in the second inductor.

4. The bidirectional DC-DC converter according to claim 3, wherein the control signal generator outputs the first control signal on the basis of a sensing voltage sensed at both terminals of the first capacitor and the sensing current.

5. The bidirectional DC-DC converter according to claim 2, wherein the controller controls the first to eighth switching devices to boost a voltage applied to the second capacitor and transfer the boosted voltage to the first capacitor.

6. The bidirectional DC-DC converter according to claim 1, wherein the memory device outputs the second control signal having a logic level opposite to a previous logic level in synchronization with a rising edge of the first control signal.

7. The bidirectional DC-DC converter according to claim 6, wherein the memory device comprises a T flip-flop for outputting the second control signal as a Q signal and outputting the third signal as a Q bar signal, on the basis of the first control signal.

8. The bidirectional DC-DC converter according to claim 1, wherein the first calculator comprises:
   a first OR gate for outputting a first pulse signal on the basis of the first and second control signals; and
   a second OR gate for outputting a second pulse signal on the basis of the first and third control signals,
   wherein the first logic level is a high logic level.

9. The bidirectional DC-DC converter according to claim 1, wherein the second calculator:
   outputs the first pulse signal as the fifth and eighth gating signals;
   inverts the first pulse signal and outputs the inverted signal as the first and fourth gating signals;
   outputs the second pulse signal as the sixth and seventh gating signals; and
   inverts the second pulse signal and outputs the inverted signal as the second and third gating signals.

10. The bidirectional DC-DC converter according to claim 9, wherein the second calculator comprises:
    a first NOT gate for inverting the first pulse signal and outputting the inverted signal as first and fourth gating signals; and
    a second NOT gate for inverting the second pulse signal and outputting the inverted signal as second and third gating signals.

11. A bidirectional DC-DC converter comprising:
    a transformer;
    a primary-side full bridge circuit coupled to a primary side of the transformer, the primary-side full bridge circuit having first and second switching devices of a first leg and third and fourth switching devices of a second leg;
    a secondary-side full bridge circuit coupled to a secondary side of the transformer, the secondary-side full bridge circuit having fifth and sixth switching devices of a third leg and seventh and eighth switching devices of a fourth leg;
    a first capacitor coupled to the primary-side full bridge circuit;
    a second capacitor coupled to the secondary-side full bridge circuit; and
    a controller for controlling the primary-side and secondary-side full bridge circuits,
    wherein the controller comprises:
    a control signal generator for outputting a first control signal on the basis of a sensing signal;
    a memory device for outputting second and fourth control signals having a logic level opposite to a previous logic level and a third control signal having the opposite logic level to the second control signal in synchronization with a shift of the first control signal; and
    a calculator for outputting first to eighth gating signals according to logic levels of the first to fourth control signals.

12. The bidirectional DC-DC converter according to claim 11, further comprising:
    a first inductor coupled between the primary-side full bridge circuit and the primary side of the transformer; and a second inductor coupled between the secondary-side full bridge circuit and the second capacitor.

13. The bidirectional DC-DC converter according to claim 12, wherein the sensing signal is a sensing current flowing in the second inductor.

14. The bidirectional DC-DC converter according to claim 13, wherein the control signal generator outputs the first control signal on the basis of a sensing voltage sensed at both terminals of the first capacitor and the sensing current.

15. The bidirectional DC-DC converter according to claim 11, wherein the memory device:
   outputs the second control signal having a logic level opposite to a previous logic level in synchronization with a rising edge of the first control signal; and
   outputs the fourth control signal having a logic level opposite to a previous logic level in synchronization with a falling edge of the first control signal.

16. The bidirectional DC-DC converter according to claim 15, wherein the memory device comprises:
   a first T flip-flop for outputting the second control signal as a Q signal and outputting the third signal as a Q bar signal, on the basis of the first control signal; and
   a second T flip-flop for outputting the fourth control signal as a Q signal on the basis of the first control signal of which logic level is inverted.

17. The bidirectional DC-DC converter according to claim 11, wherein the calculator comprises:
   a first OR gate for outputting a signal having a high logic level when at least one of the first and second control signals has the high logic level, on the basis of the first and second control signals; and
   a second OR gate for outputting a signal having the high logic level when at least one of the first and third control signals has the high logic level, on the basis of the first and third control signals.

18. The bidirectional DC-DC converter according to claim 17, wherein the output signal of the first OR gate is the fifth and eighth gating signals, and
   the output signal of the second OR gate is the sixth and seventh gating signals.

19. The bidirectional DC-DC converter according to claim 18, wherein the calculator:
   outputs the second control signal as the third gating signal; and
   outputs the fourth control signal as the first gating signal.

20. The bidirectional DC-DC converter according to claim 17, wherein the calculator further comprises:
   a first dead time setting unit for adjusting the width of the high logic level of the second control signal and outputting the second control signal as the fourth gating signal; and
   a second dead time setting unit for adjusting the width of the high logic level of the third control signal and outputting the third control signal as the second gating signal.

* * * * *